(12) United States Patent
Tanaka et al.

(10) Patent No.: US 8,886,784 B2
(45) Date of Patent: Nov. 11, 2014

(54) COMPUTER SYSTEM AND MANAGEMENT METHOD THEREOF

(75) Inventors: Atsushi Tanaka, Saitama (JP); Masaru Orii, Yokohama (JP)

(73) Assignee: Hitachi, Ltd., Tokyo (JP)

(*) Notice: Subject to any disclaimer, the term of this patent is extended or adjusted under 35 U.S.C. 154(b) by 261 days.

(21) Appl. No.: 13/500,138

(22) PCT Filed: Feb. 2, 2012

(86) PCT No.: PCT/JP2012/000716
§ 371 (c)(1),
(2), (4) Date: Apr. 4, 2012

(87) PCT Pub. No.: WO2013/114463
PCT Pub. Date: Aug. 8, 2013

(65) Prior Publication Data
US 2013/0205164 A1    Aug. 8, 2013

(51) Int. Cl.
*G06F 15/173* (2006.01)
*H04L 12/24* (2006.01)
(52) U.S. Cl.
CPC ............ *H04L 41/50* (2013.01); *H04L 41/5016* (2013.01)
USPC .......................................... 709/223; 709/224
(58) Field of Classification Search
CPC ............................. H04L 41/50; H04L 41/5016
USPC ......................................... 709/223, 224, 229
See application file for complete search history.

(56) References Cited

U.S. PATENT DOCUMENTS

| | | | | |
|---|---|---|---|---|
| 8,185,124 | B2* | 5/2012 | Antic et al. ................. | 455/452.1 |
| 2004/0042489 | A1* | 3/2004 | Messick et al. .............. | 370/468 |
| 2006/0159020 | A1 | 7/2006 | Porat | |
| 2006/0215656 | A1* | 9/2006 | Shirogane ..................... | 370/389 |
| 2007/0019550 | A1* | 1/2007 | Enomoto ...................... | 370/235 |
| 2007/0093124 | A1 | 4/2007 | Varney et al. | |
| 2007/0180134 | A1* | 8/2007 | Steinbach et al. ............ | 709/230 |
| 2008/0051048 | A1* | 2/2008 | Tzamaloukas et al. ..... | 455/187.1 |
| 2008/0172441 | A1* | 7/2008 | Speicher et al. .............. | 709/201 |
| 2008/0215767 | A1* | 9/2008 | Nagami et al. ................. | 710/19 |
| 2012/0131200 | A1* | 5/2012 | Rogers et al. ................. | 709/226 |
| 2012/0221955 | A1* | 8/2012 | Raleigh et al. ................ | 715/736 |
| 2013/0198478 | A1* | 8/2013 | Bitner .......................... | 711/170 |

FOREIGN PATENT DOCUMENTS

WO    WO 0033511 A1 *  6/2000
WO    2010-119479 A1    10/2010

* cited by examiner

*Primary Examiner* — Ario Etienne
*Assistant Examiner* — Uzma Alam
(74) *Attorney, Agent, or Firm* — Volpe and Koenig, P.C.

(57) ABSTRACT

The present invention makes it possible to dynamically and optimally change QoS while taking the balance of a system as a whole into consideration. With the present invention, communications parameters comprising band allocation information with respect to a plurality of interfaces of communications paths are set at a management device, and a host device, a switch device, and a storage device communicate based on the communications parameters that have been set. Then, in the system operation stage, the management device or the switch device acquires statistical information comprising band usage amounts with respect to the communications paths among a port of the host device, a port of the storage device, and a port of the switch device, changes, based on the statistical information, the band allocation that has been set with respect to the plurality of interfaces, and, further, determines whether or not the band allocation as changed is appropriate with respect to the system (see FIG. 9).

11 Claims, 18 Drawing Sheets

FIG. 18

Parameter management table

| Device number | Port number | I/F type | Priority time | Failure rate | Band | Priority | Substitute port |
|---|---|---|---|---|---|---|---|
| 1 | 0 | Ether | 9 - 17 | 10% | 10% | 9 | 2 - 0 |
| 1 | 0 | FCoE | 17 - 5 | 10% | 90% | 1 | 2 - 0 |
| 2 | 3 | FCoE | 0 - 24 | 10% | 100% | 10 | 2 - 3 |
| 2 | 3 | Ether | 0 - 24 | 60% | 100% | 10 | 2 - 4 |

1801　1802　1803　1804　1805　1806　1807　1808

1800

COMPUTER SYSTEM AND MANAGEMENT METHOD THEREOF

TECHNICAL FIELD

The present invention relates to a computer system and a management method thereof. By way of example, it relates to the management of a large-scale storage system comprising a plurality of host computers and storage devices.

BACKGROUND ART

As society has become increasingly information-oriented in recent years, the amount of data managed by corporations has shown a steady increase. On the other hand, for such purposes as cutting management costs of IT systems, there is an emerging trend where private corporations are beginning to opt to lease IT systems from vendors specializing in the management and provision of IT systems, instead of owning their own IT systems. Along therewith, data managed by corporations are starting to be aggregated within IT systems owned by vendors specializing in the management and provision of IT systems. In order to enable the accumulation of such vast amounts of aggregated data, storage systems included in IT systems are becoming ever larger in scale.

With current IT systems, if, for example, performance drops at a path between a given I/F of a host device and a given I/F of a switch device, the band used at this path is changed, thereby enabling QoS control. By way of example, Patent Literature 1 discloses switching FCoE (Fibre Channel over Ethernet (Ethernet is a registered trademark)) paths based on data transfer amount.

CITATION LIST

Patent Literature

PTL 1: WO 2010/119479 A1

SUMMARY OF INVENTION

Technical Problem

However, if the utilization rates of FC (Fibre Channel) and Ethernet (registered trademark) within FCoE paths were to vary, it would not be possible to optimize the band allocation among FCoE paths just by switching FCoE paths as in Patent Literature 1.

In addition, with current IT systems, since the I/F (interface) is fixed per path, allocating performance (i.e., QoS (Quality of Service), also referred to as band guarantee) depending on the job application is not possible. Further, it is not possible to carry out optimal allocation among at least one host device, at least one switch, and at least one storage device (also referred to as a storage subsystem) of an IT system.

In addition, with current IT systems, while QoS control with respect to a given individual path may be possible, QoS control that takes the balance of the overall system into consideration cannot be executed. Since the overall balance is not considered, while the band may be improved from a point-to-point perspective, the band is arbitrarily increased/decreased with respect to each point-to-point, as a result of which it may sometimes not be possible to guarantee the desired band for the system as a whole.

Further, with future IT systems, plural I/F ports, such as FCoE, etc., will become common, and it is speculated that QoS control will then become possible. Further, it is speculated that there will be a shift towards performance optimization for the system as a whole by performing performance allocation among ports. In addition, performing control at a switch device located at the center of the system for the purpose of performance optimization is also conceivable.

The present invention is made in view of such circumstances, and provides a technique that makes it possible to dynamically and optimally change QoS, taking the balance of the system as a whole into consideration.

Solution to Problem

In order to solve the problems above, with the present invention, communications parameters including band allocation information with respect to a plurality of interfaces of communications paths are set at a management device, and a host device, a switch device, and a storage device communicate based on the communications parameters that have been set. In addition, in the system operation stage, the management device or the switch device acquires statistical information including band usage amounts with respect to communications paths among a port of the host device, a port of the storage device, and a port of the switch device, and, based on this statistical information, changes the band allocation that has been set with respect to the plurality of interfaces, and, further, determines whether or not the band allocation as changed is appropriate for the system.

Further features relating to the present invention will become apparent from the following description and the accompanying drawings. Furthermore, embodiments of the present invention are attained and realized through elements, various combinations of elements, and embodiments as provided in the following detailed description and the appended claims.

It is to be understood that the description in the present specification is for purposes of illustration only and that it does not by any means limit the scope of the present invention or its applications.

Advantageous Effects of Invention

With the present invention, it becomes possible to dynamically and optimally change QoS taking the balance of the system as a whole into consideration.

BRIEF DESCRIPTION OF DRAWINGS

FIG. 18 is a diagram showing a structure example of a parameter management table 1800.

DESCRIPTION OF EMBODIMENTS

Figure 1:
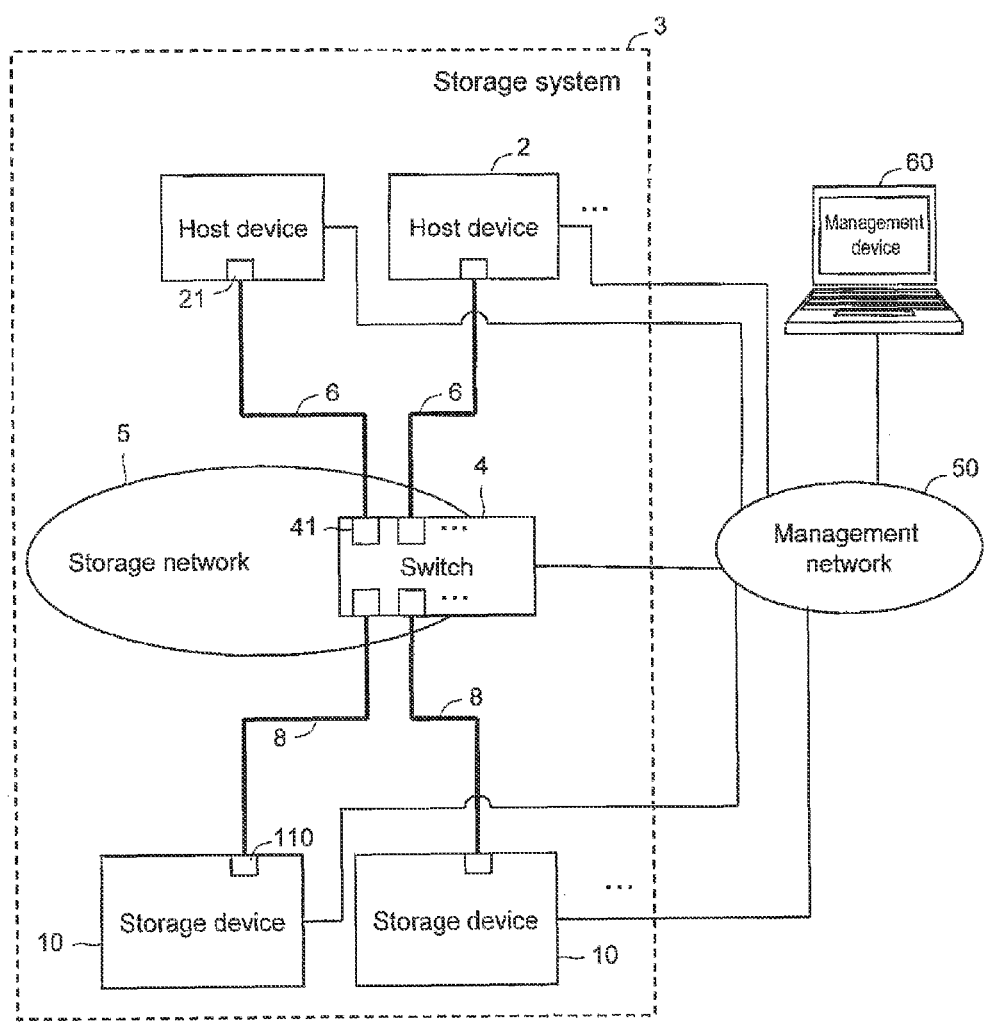
FIG. 1 is a diagram showing a schematic configuration example of an IT system 1 according to an embodiment of the present invention.

Embodiments of the present invention are described below with reference to the accompanying drawings. In the accompanying drawings, elements with like functions may sometimes be designated with like reference numerals. It is noted that the accompanying drawings indicate specific embodiments and implementation examples according to the principles of the present invention, However, they are provided for purposes of understanding the present invention, and are by no means to be used to construe the present invention in a limiting manner.

The present embodiments are described in sufficient detail so as to enable a person skilled in the art to practice the present invention. However, other implementations and embodiments are also possible, and it is to be understood that configurational and structural modifications and replacements of various elements are possible without departing from the technical scope and spirit of the present invention. Accordingly, the following description is not to be construed as limiting.

Further, embodiments of the present invention may be, as discussed later, implemented through software that runs on a general-purpose computer, or through dedicated hardware or a combination of software and hardware.

It is noted that, in the following description, various types of information of the present invention are described in "table" format. However, such information need not necessarily be expressed through a table-based data structure, and may instead be expressed through such data structures as lists, DBs, queues, etc., or in some other manner. Accordingly, in order to illustrate the fact that they are not dependent on data structure, "tables," "lists," "DBs," "queues," etc., may sometimes be referred to simply as "information."

Further, in describing the contents of various information, such expressions as "identification information," "identifier," "name," "appellation," and "ID" may be used, and they may be used interchangeably.

Descriptions are provided below with respect o various processes in the embodiments of the present invention, assuming a "program" as the subject (operating body) of the sentence. However, since programs perform prescribed processes using memory and communications ports (communications controllers) by being executed by a processor, the descriptions may be construed with the subject of the sentence being a processor. Further, processes disclosed with a program as the subject may also be construed as processes performed by a computer or information processing device, e.g., a management server, etc. Some or all of the programs may be realized through dedicated hardware, or in modules. Various programs may be installed on various computers by means of program distribution servers, storage media, etc.

<Configuration of IT System>

FIG. 1 is a diagram showing a schematic configuration example of an IT system (also referred to as a computer system or information processing system) 1 according to an embodiment of the present invention. As shown in the diagram, this IT system 1 comprises: at least one host device 2 (server device); at least one storage device 10; a storage network 5 comprising at least one network switch (hereinafter "switch 4"); a management network 50; and at least one management device 60. The host devices 2 are communicably connected with the storage devices 10 via the storage network 5, thereby collectively forming a storage system 3. The management device 60, the host devices 2, the switch 4, and the storage devices 10 are connected via the management network 50. It is noted that the IT system 1 is built at a data center where it is operated, or within the premises of a vendor that performs assessment (testing) of the IT system 1.

Signal splitters (second signal splitters) are respectively provided along communications cables 8 (communications lines) that link communications ports 41 of the switch 4 and respective communications ports 110 of the storage devices 10. The signal splitters 9 supply, to a frame acquisition/generation device, copies (split signals) (second communications information) of the frames traveling through these communications cables 8.

The communications cables 6 (or 8) may comprise metal cables that carry electric signals, or optical fibers (multi-mode, single-mode) that carry optical signals.

<Host Device and Management Device>

The host devices 2 are information processing devices (computers) that send I/O requests and access storage areas provided by the storage devices 10. The host devices 2 may be, for example, personal computers, work stations, mainframes, etc. Such application software as bank ATM systems, airline seat reservation systems, financial report information systems, invoice issuing systems, etc., run on the host devices 2. The host devices 2 may also function as NAS (Network Attached Storage), for example.

The management device 60 may comprise, for example, a personal computer, a work station, etc. The management device 60 is connected with the host devices 2, the switch 4, and the storage devices 10 via a management network (e.g., a LAN (Local Area Network)). The management device 60 acquires configuration information, information indicating communication conditions, etc., from each of the host devices 2, the switch 4, and the storage devices 10, and executes path switching control, band switching control, etc., based on the acquired information. In addition, the management device 60 may comprise, for example, a GUI (Graphical User Interface)-based or CLI (Command Line Interface)-based user interface for the user to perform testing (assessment) of the switch 4.

Figure 2:
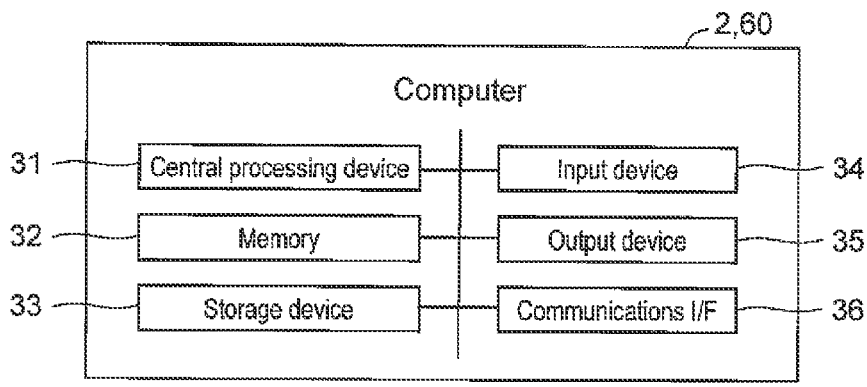
FIG. 2 is a diagram showing an internal configuration example of a host device 2 and a management device 60.

FIG. 2 is a diagram showing an example of the hardware configuration of the host devices 2 or the management device 60. As shown in the diagram, the host devices 2 and the management device 60 each comprise: a central processing device 31; memory 32; a storage device 33; an input device 34; an output device 35; and a communications interface (hereinafter "communications I/F 36"). The central processing device 31 may comprise, for example, a CPU (Central Processing Unit) or an MPU (Micro Processing Unit). The memory 32 may be RAM (Random Access Memory) or ROM (Read Only Memory). The storage device 33 may be, for example, a hard disk, or a semiconductor storage device (SSD (Solid State Drive)). The input device 34 may be a keyboard, a mouse, a touch panel, etc. The output device 35 may be, for example, a liquid crystal monitor, or a printer. The communications I/F 36 may be, for example, an NIC (Network Interface Card), or an HBA (Host Bus Adaptor). It is noted that the communications I/F 36 comprises a communications port 21 to be connected with the communications port 41 of the switch 4.

<Storage Device>

Figure 3:
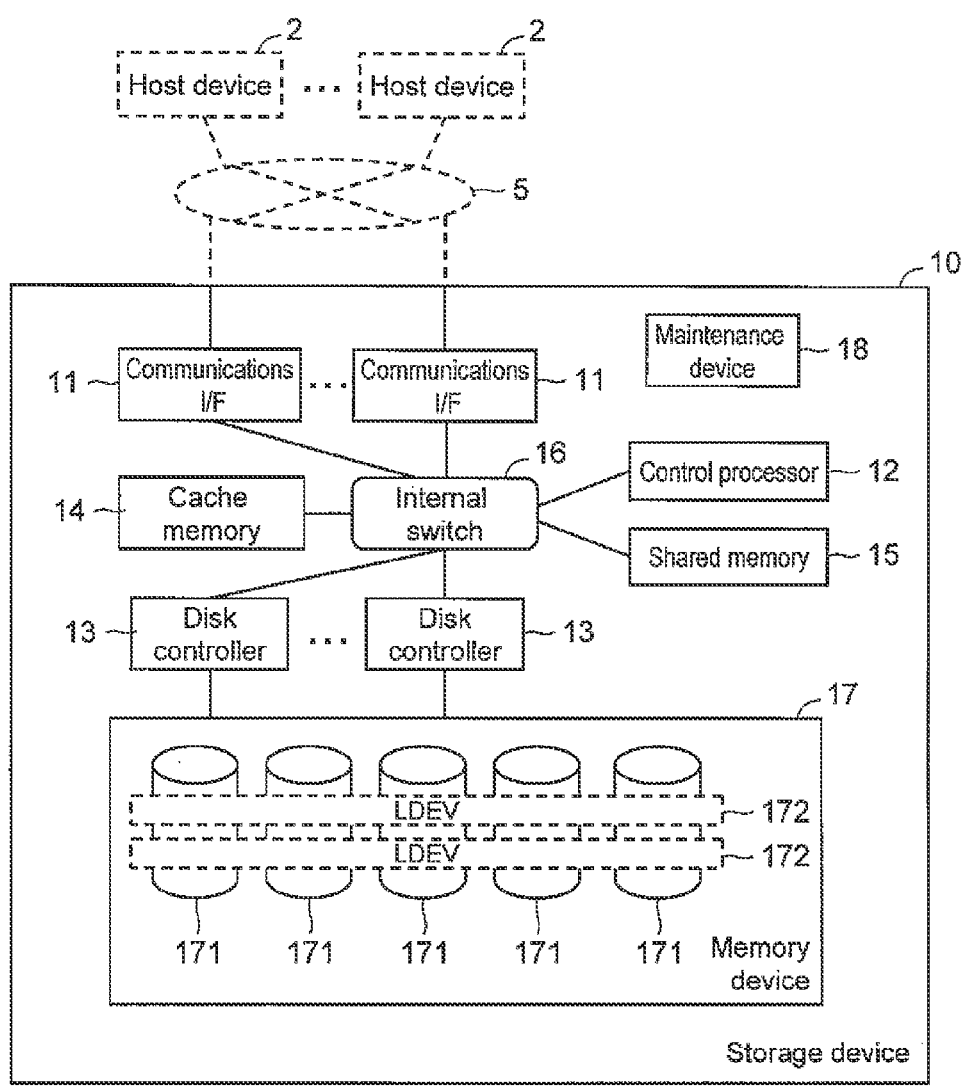
FIG. 3 is a diagram showing an internal configuration example of a storage device 10.

FIG. 3 is a diagram showing an example of the hardware configuration of the storage devices 10. As shown in the diagram, this storage device 10 comprises: at least one communications interface (hereinafter "communications I/F 36"); at least one control processor 12 (microprocessor); at least one disk controller 13; cache memory 14; shared memory 15; an internal switch 16; a memory device 17; and a maintenance device 18 (service processor). Of the above, the communications I/Fs 11, the control processor 12, the disk controllers 13, the cache memory 14, and the shared memory 15 are communicably interconnected via the internal switch 16.

The communications I/Fs 11 receive I/O requests from the host devices 2 (data write requests, data read requests, etc.), and transmit to the host devices 2 processing responses (data that has been read, read completion reports, write completion reports, etc.) regarding the received I/O requests. The communications I/Fs 11 are equipped with a protocol control function for the communications that take place with the host devices 2.

In accordance with the above-mentioned I/O requests received by the communications I/Fs 11, the control processes 12 performs processes regarding the data transfer that takes place among the communications I/Es 11, the disk controllers 13, and the cache memory 14. The control processor 12 performs, for example, the handing over of data (data read from the memory device 17, data to be written to the memory device 17) among the communications I/Fs 11 and the disk controllers 13 that takes place via the cache memory 14, and the staging (i.e., reading data from the memory device 17) or de-staging (i.e., writing data to the memory device 17) of data stored on the cache memory 14.

The cache memory 14 may comprise RAM (Random Access Memory), etc., that enables high-speed access. The cache memory 14 stores, for example, data to be written to the memory device 17 (hereinafter "write data") and data that has been read from the memory device 17 (hereinafter "read data"). The shared memory 15 stores various types of information that are used to control the storage device 10.

The disk controllers 13 communicate with the memory device 17 in reading data from the memory device 17 or in writing data to the memory device 17.

The internal switch 16 may comprise, for example, a high-speed cross bar switch. Communications that take place via the internal switch 16 are performed pursuant to such protocols as Fibre Channel, iSCSI (internet Small Computer System Interface), TCP/IP, etc.

The memory device 17 may comprise such recording media as hard disk drives 171, semiconductor storage devices (SSDs), etc. It is noted that, in the present embodiment, the memory device 17 comprises hard disk drives 171 of the SAS (Serial Attached SCSI) and SATA (Serial ATA) types. The hard disk drives 1711 are controlled pursuant to the RAID (Redundant Arrays of Inexpensive (or Independent) Disks) control scheme (RAID 0, 1, 5, 6, etc.).

The memory device 17 provides storage areas in units each comprising a logical device 172 (LDEV) configured using storage areas provided by RAID (e.g., storage areas of RAID groups (parity groups)). However, the unit of storage area provided by the memory device 17 is by no means limited to LDEVs.

(i) Communications Interface

Figure 4A:
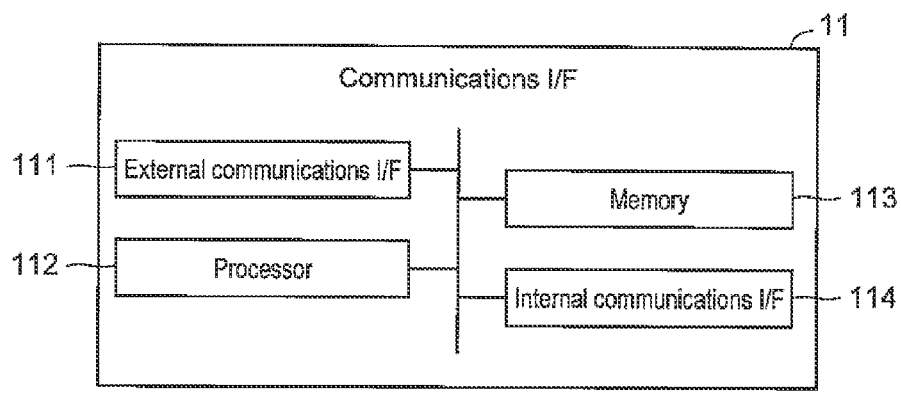
FIG. 4A is a diagram showing an internal configuration example of a communications I/F 11.

FIG. 4A shows a hardware configuration example of the communications I/Fs 11. As shown in the diagram, the communications I/Fs 11 each comprise: an external communications interface (hereinafter "external communications I/F 111"); a processor 112; memory 113; and an internal communications interface (hereinafter "internal communications I/F 114). The external communications I/F 111 may be, for example, an NIC, or an HBA. The external communications I/F 111 comprises the communications port 110 to be connected with the communications port 41 of the switch 4.

The processor 112 may be a CPU or an MPU. The memory 113 may be RAM or
ROM. The internal communications I/F 114 communicates with the control processor 12, the disk controllers 13, the cache memory 14, and the shared memory 15 via the internal switch 16.

(ii) Control Processor

Figure 4B:
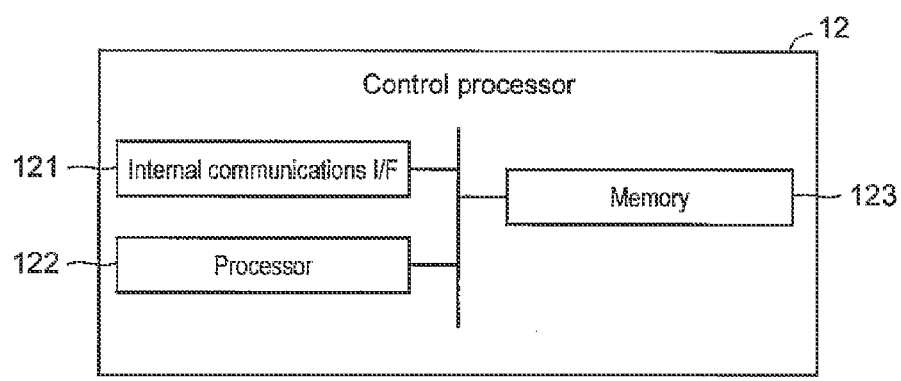
FIG. 4B is a diagram showing an internal configuration example of a control processor 12.

FIG. 4B is a diagram showing a hardware configuration example of the control processor 12 that the storage devices 10 each have. As shown in the diagram, the control processor 12 comprises: an internal communications interface (hereinafter "internal communications I/F 121"); a processor 122; and memory 123. The internal communications I/F 121 communicates with the communications I/Fs 11, the disk controllers 13, the cache memory 14, and the shared memory 15 via the internal switch 16. The processor 122 may be a CPU, an MPU, DMA (Direct Memory Access), etc. The memory 123 may be RAM or ROM.

(iii) Disk Controller

Figure 4C:
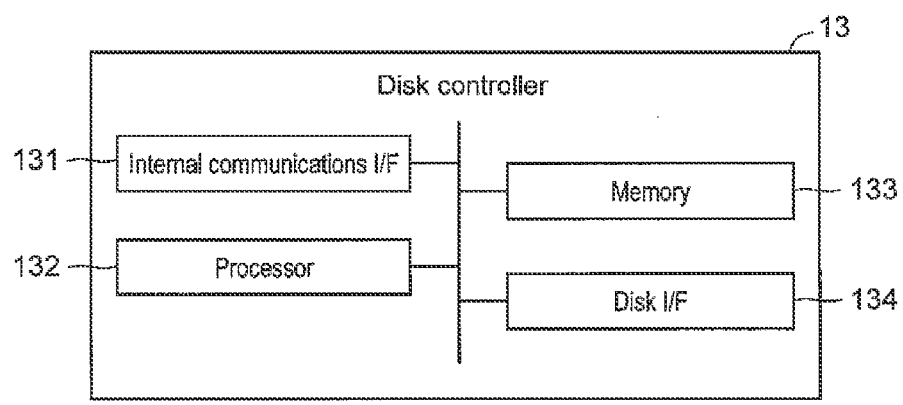
FIG. 4C is a diagram showing an internal configuration example of a disk controller 13.

FIG. 4C is a diagram showing a hardware configuration example of the disk controllers 13. As shown in the diagram, the disk controllers 13 each comprise: an internal communications interface (hereinafter "internal communications I/F 131"); a processor 132; memory 133; and a disk interface (hereinafter "disk I/F 134"). The internal communications I/F 131 communicates with the communications I/Fs 11, the control processor 12, the cache memory 14, the shared memory 15, etc., via the internal switch 16. The processor 132 may be a CPU or an MPU. The memory 133 may be RAM or ROM. The disk I/F 134 communicates with the memory device 17.

(iv) Maintenance Device

The maintenance device 18 (SVP: SerVice Processor) is a computer that comprises a CPU and memory, controls the various elements of the storage device 10, and monitors their states. The maintenance device 18 is communicably connected with the communications I/Fs 11, the control processor 12, the disk controllers 13, the cache memory 14, the shared memory 15, the internal switch 16, etc., via the internal switch 16, LAN (Local Area Network), etc.

<Network>

The storage network 5 may be, for example, a SAN (Storage Area Network), a LAN, the internet, dedicated lines, a public communications network, etc. The communications between the host devices 2 and the storage devices 10 are performed pursuant to such protocols as TCP/IP, iSCSI, Fibre Channel Protocol, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), etc.

If the storage network 5 is configured with a SAN, the switch 4 may be, for example, a fibre channel switch (hereinafter "FC-SW"). If the storage network 5 is configured with a LAN, the switch 4 may be, for example, a switching hub or a router. For the present embodiment, it is assumed that the storage network 5 is a SAN, and that the switch 4 is a fibre channel switch (FC-SW).

<Switch>

Figure 5:
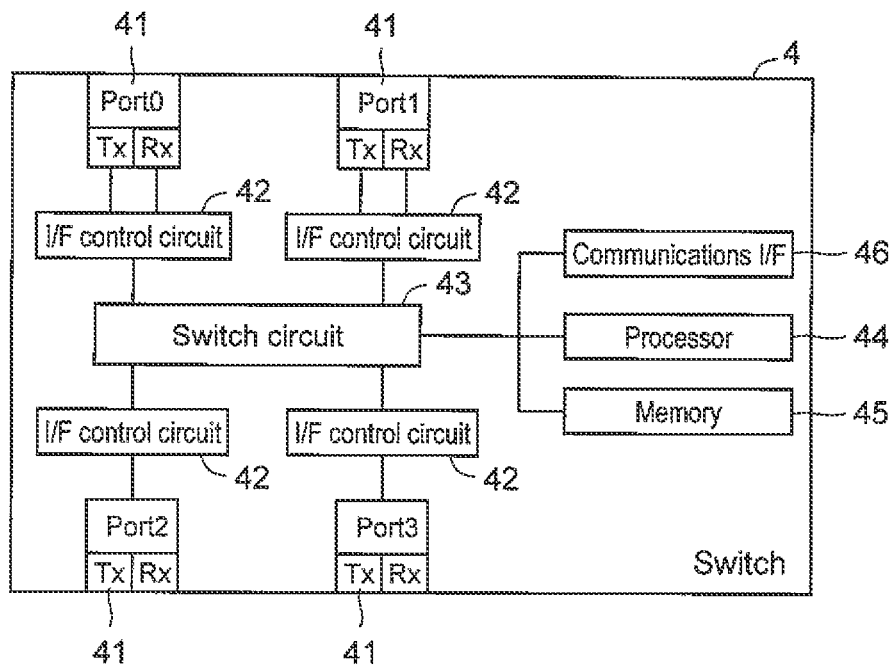
FIG. 5 is a diagram showing the internal configuration of a switch 4.

FIG. 5 is a diagram showing a hardware configuration example of the switch 4. As shown in the diagram, this switch 4 comprises: a plurality of communications ports 41 that transmit and receive data; a plurality of I/F control circuits 42; a switch circuit 43; a processor 44; and memory 45. It is noted that while there is shown in the diagram an example of the switch 4 that has four communications ports 41, the number of communications ports that the switch 4 may have is by no means limited as such.

The communications ports 41 each comprise a transceiver comprising a transmission circuit (Tx) and reception circuit (Rx) for electric signals or optical signals. The communications ports 41 are each configured using, for example, a CUBIC (Giga Bit Interface Converter) or SEP (Small Form Factor Pluggable). The communications ports 41 each include a photoelectric conversion circuit, a signal multiplexer circuit, a collision conversion circuit, etc.

The I/F control circuits 42 are provided in correspondence with the respective communications ports 41. The I/F control circuits 42 perform data communications between the respective communications ports 41 and the switch circuit 43, control of the respective communications ports 41, data error control, etc. The switch circuit 43 is a circuit that performs path selection among the communications ports 41. This path selection is performed through such schemes as, for example, cross bar scheme, bus scheme, ring scheme, shared memory scheme, etc.

The processor 44 may comprise a CPU, an MPU, a custom LSI (Large-Scale Integration), etc. By executing programs stored on the memory 45, the processor 44 realizes a protocol processing function, a routing function, a zoning function, and a failure management function. The memory 45 may comprise RAM and/or ROM (including rewritable non-volatile memory such as flash memory, etc.). The memory 45 may store, in addition to the programs mentioned above, a routing table. Of the memory 45, the non-volatile memory may store firmware for realizing the various functions of the switch 4.

The communications interface (hereinafter "communications I/F 46") is an interface that is compliant with such standards as, for example, LAN, RS-232C, USB (Universal Serial Bus), etc., and communicably connects the switch 4 with an external device. Various operational settings of the switch 4, such as routing settings, zoning settings, etc., of the switch 4, failure management-related settings and information gathering, etc., may be performed at an external device to be connected via the communications I/F 46. It is also possible to rewrite (update), via the communications I/F 46, the firmware stored on the non-volatile memory.

<FC Frame Structure>

Figure 6:
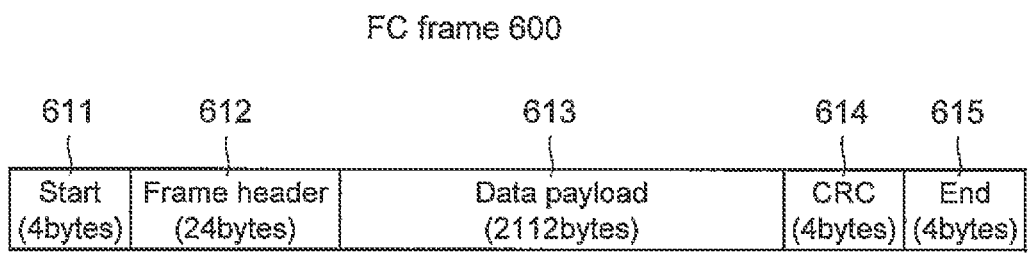
FIG. 6 is a diagram showing the structure of an FC frame.

FIG. 6 is a diagram showing a structure example of the FC frames that travel through the switch 4. FC frames are frames that are compliant with the Fibre Channel standards, An FC frame 600 is a variable-length frame, and its maximum length is 2148 bytes.

As shown in the diagram, the FC frame 600 comprises: a start frame 611 in which a special code denoting the beginning of a frame is written; a frame header 612 in which control information is written; data payload 613 in which the data to be communicated is written; CRC 614 (CRC: Cyclic Redundancy Check); and an end frame 615 in which a special code denoting the end of the frame is written. It is noted that, of the above, the frame header 612 contains an identifier (SID) for the communications port of the transmission source of the FC frame 600, and an identifier (DID) for the communications port of the transmission destination.

<FCoE Frame Structure>

Figure 7:
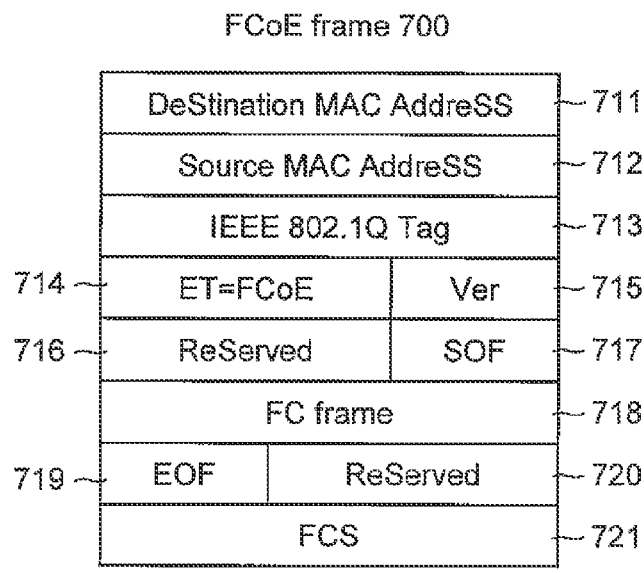
FIG. 7 is a diagram showing the structure of an FCoE frame.

FIG. 7 is a diagram showing the structure of a frame compliant with the Fibre Channel over Ethernet (registered trademark) (FCoE) standards (the frame will hereinafter be referred to as an ECoE frame 700).

As shown in the diagram, the FCoE frame 700 comprises: a Destination MAC Address 711 in which the MAC address of the destination of the frame is stored; a Source MAC Address 712 in which the data transmission source is stored; an IEEE 802.1Q Tag 713; ET 714 (ET: Ether (registered trademark) Type); a version code 715; a reserved area 716 (reserved); SOF 717 denoting the beginning of the data; an FC frame 718 (with the same contents as the FC frame 600 in FIG. 6); EOF 719 denoting the end of the data; a reserved area 720 (reserved); and error check information 721 (FCS: Frame Check Sequence) for Ethernet (registered trademark). It is noted that, as in the FC frame 600, the frame header 612 of the FC frame 718 contains an identifier (SID) for the communications port of the transmission source of the FC frame 718, and an identifier (DID) for the communications port of the transmission destination, <iSCSI Frame Structure>

Figure 8:
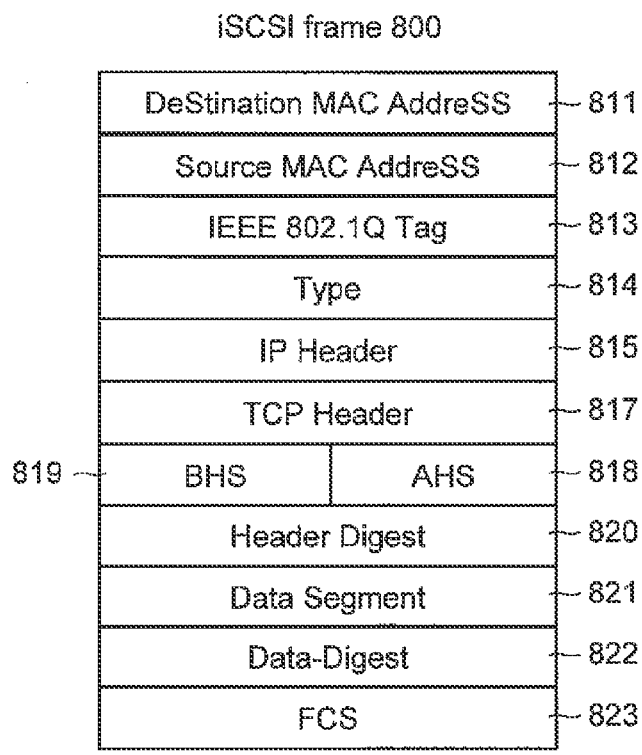
FIG. 8 is a diagram showing the structure of an iSCSI frame.

FIG. 8 is a diagram showing a frame structure that is compliant with the iSCSI (internet Small Computer System Interface) standards.

As shown in the diagram, an iSCSI frame 800 comprises: a Destination MAC Address 811 in which the MAC address of the destination of the frame is stored; a Source MAC Address 812 in which the data transmission source is stored; an IEEE 802.1Q Tag 813; type 814 denoting the type (in this case, iSCSI) and version of the frame; an IP header 815; a TCP header 817; ABS 818 and BHS 819 corresponding to reserved areas (reserved); a header digest 820 storing header information; a data segment 821 storing the data to be communicated; a data-digest 822 corresponding to CRC and sum check; and FCS 823 denoting the end of the frame.

<General Software Configuration>

Figure 9:
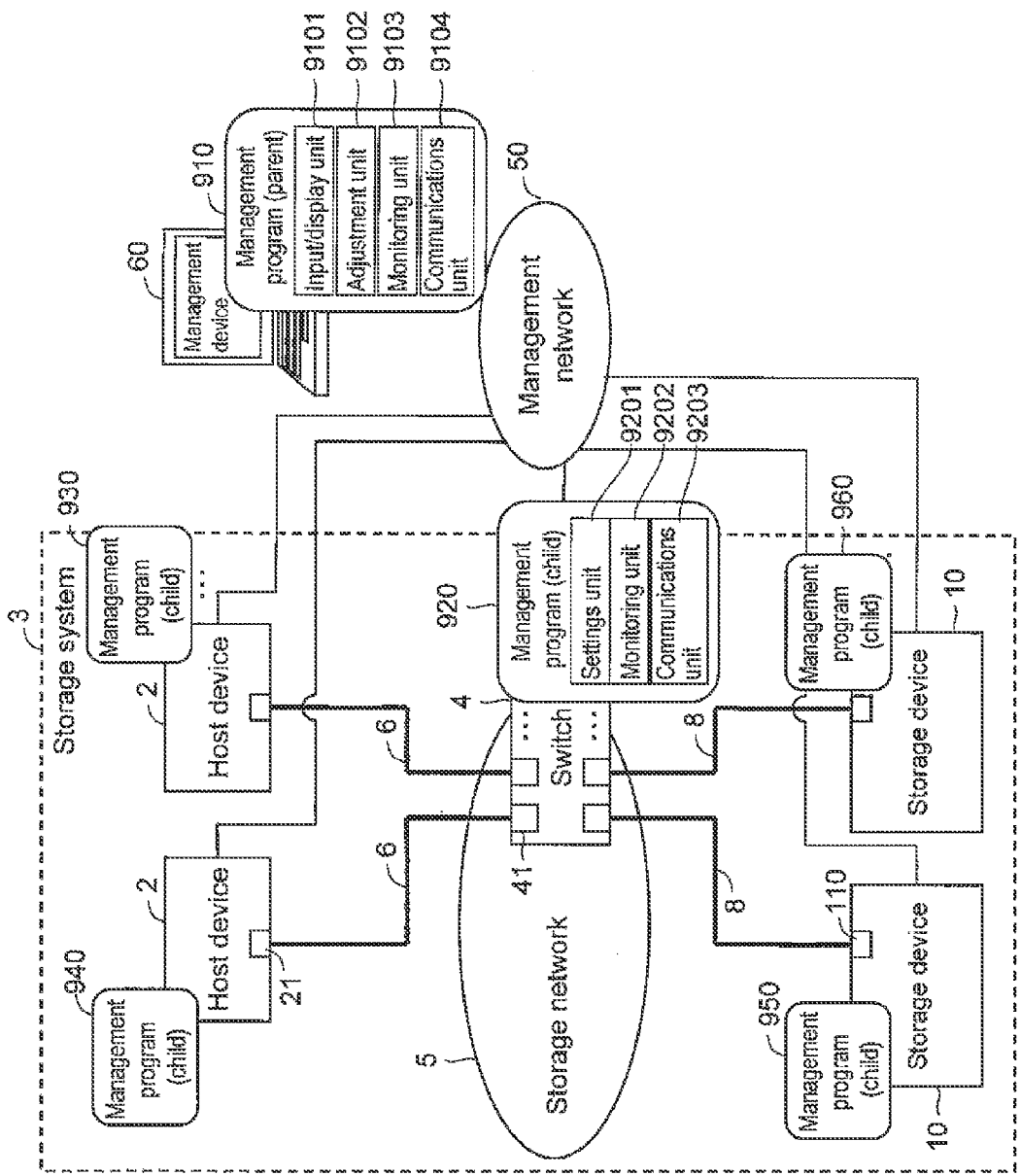
FIG. 9 is a diagram showing a software configuration example with respect to the IT system 1.

FIG. 9 is a diagram generally showing the software configuration of the IT system 1 according to an embodiment of the present invention. In other words, FIG. 9 shows which hardware holds what kind of programs.

The management device 60 comprises, as a management program 910: an input/display unit (which may also be referred to as an "input/display program") 9101; an adjustment unit (adjustment program) 9102; a monitoring unit (monitoring program) 9103; and a communications unit (communications program) 9104.

The host devices 2, the switch 4, and the storage devices 10 each comprise, as a management program 920: a settings unit (settings program) 9201; a monitoring unit (monitoring program) 9202; and a communications unit (communications program) 9203.

Prior to implementing the IT system 1, the administrator configures, as initial values, various settings including various bands (I/O allocation), using the input/display unit 9101 and adjustment unit 9102 of the management program 910. By way of example, settings are configured as regards what percentage of the band is to be allocated to one path (path A) between the host devices 2 and the switch 4, what percentage of the band is to be allocated to another path (path B), and, further, what the ratio of FC to IP should be for each path. The communications unit 9104 of the management device 60 then communicates with the communications unit 9203 of each device, and transmits to the respective devices (the host devices 2, the switch 4, and the storage devices 10) the various configured settings. Having received the settings, each device sets the band (I/O) to the received value using the settings unit 9201.

On the other hand, once the IT system 1 is implemented, the monitoring unit 9202 of the management program 920 of each device monitors the input/output of data at each device (access status: I/O count (IOPS), the CPU's utilization rate or load rate, response time, etc.), and transmits access status information to the management device 60 regularly (periodically, at a pre-determined time, upon detection of a pre-determined anomaly, etc.) or in response to a request from the monitoring unit 9103 of the management device 60. It is noted that the term "response time" refers to the time from when an access command is issued by the host device up to when data is received from the storage devices 10 in the context of the host devices 2, to the processing time within the switch device 4 (the time from when data is received up to when that is allocated to each port) in the context of the switch device 4, and to the time from when an access command is received up to when corresponding data is transmitted in the context of the storage devices 10. The communications unit 9104 of the management device 60 receives access status information from each device, and the input/display unit 9101 displays the received information on the display screen of a display device (not shown). The administrator looks at the displayed information, and determines whether or not the current settings are appropriate. If they are not (e.g., if a certain threshold is exceeded), a warning may be given automatically. Should the management device 60 determine that the current settings are not appropriate, the adjustment unit 9102, as will be discussed later, sets a new band or path, that setting value is transmitted to each device, and the system is run based on new settings.

Details of the processes and operations of each program will become apparent through the flowcharts discussed below.

<Software Configuration: Variation>

Figure 10:
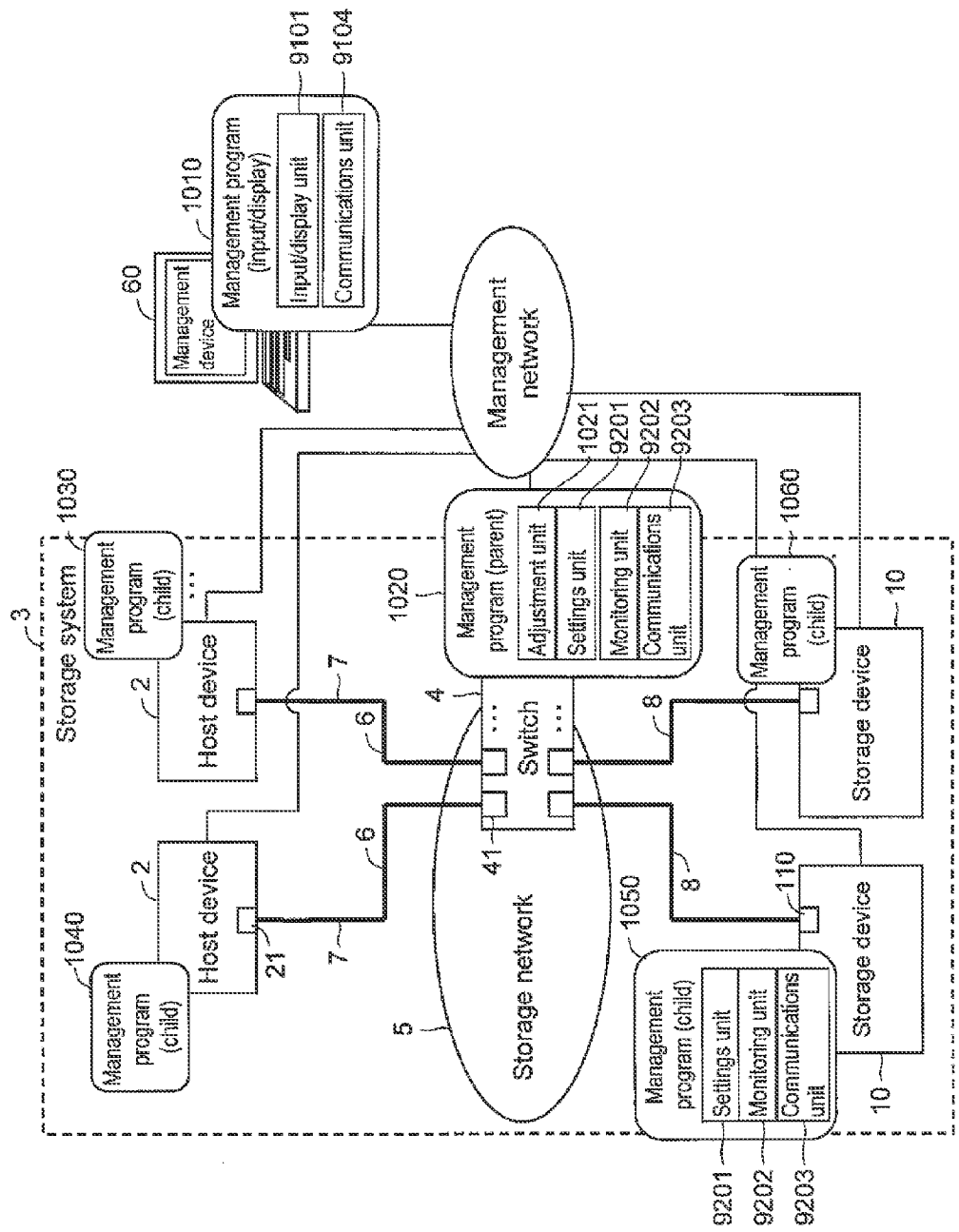
FIG. 10 is a diagram showing a variation of the software configuration with respect to the IT system 1.

FIG. 10 is a diagram generally showing the software configuration of the IT system 1 according to a variation of the present embodiment. With the configuration in FIG. 9, the management device 60 executes an adjustment process through the adjustment unit 9102. However, with the configuration in FIG. 10, the switch 4 is given an adjustment unit (adjustment program) 1021.

In other words, the management device 60 only comprises, as a management program 1010: the input/display unit (input/display program) 9101; and the communications unit (communications program) 9104. On the other hand, the switch 4 comprises, as a management program 1020: the adjustment unit (adjustment program) 1021; the settings unit (settings program) 9201; the monitoring unit (monitoring program) 9202; and the communications unit (communications program) 9203. As in FIG. 9, the host devices 2 and the storage devices 10 each comprise: the settings unit (settings program) 9201; the monitoring unit (monitoring program) 9202; and the communications unit (communications program) 9203.

The processes and operations of each program are similar to those in FIG. 9, and their details will become apparent through the flowcharts discussed below.

<Input/Display Screen>

Figure 11:
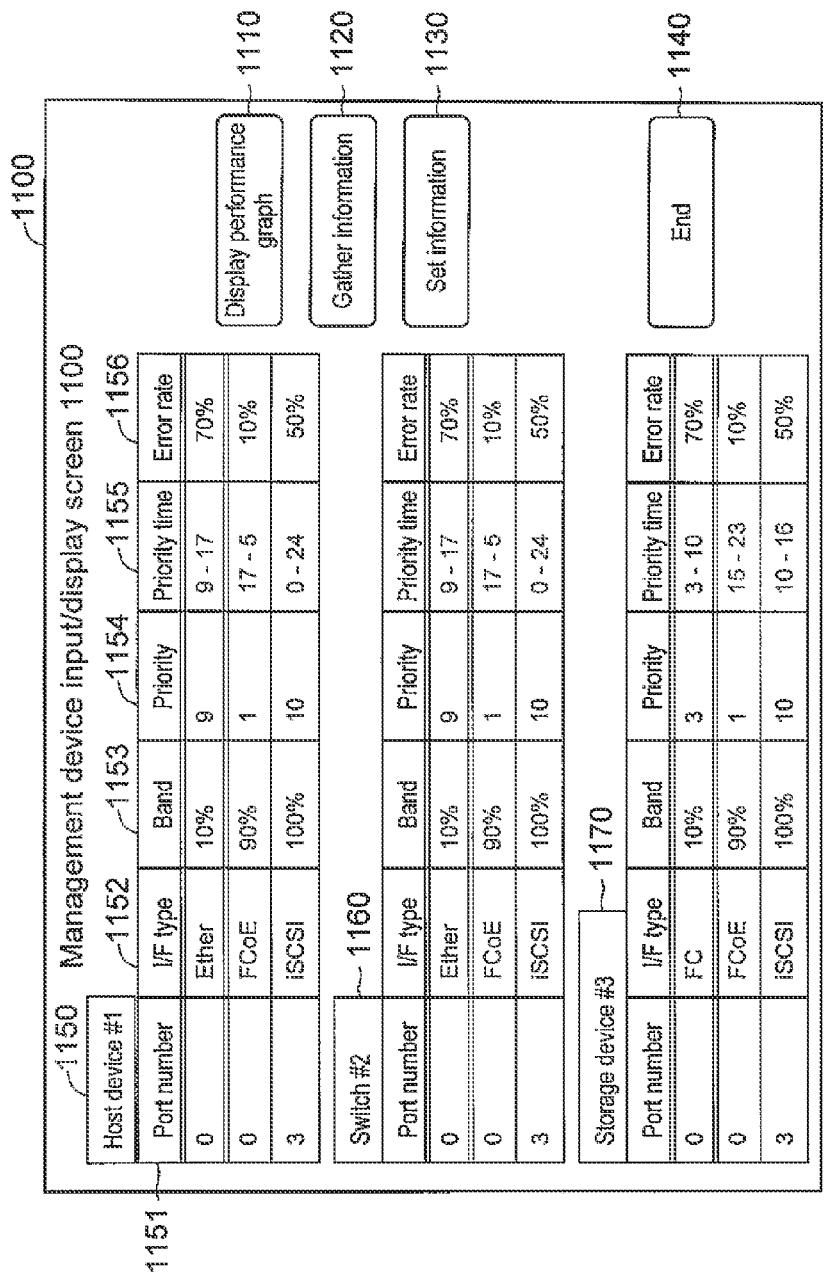
FIG. 11 is a diagram showing an example of an input/display screen 1100 outputted at the management device 60.

FIG. 11 is a diagram showing a schematic configuration (example) of an input/display screen 11100 provided by the management device 60 according to the present embodiment.

The input/display screen 1100 comprises: a display performance graph button 1110; an information gathering instruction button 1120; an information setting instruction button 1130; an end button 1140; a settings area 1150 for the host devices 2; a settings area 1160 for the switch 4; and a settings area 1170 for the storage devices 10.

Each of the settings areas 1150 to 1170 comprises, as constituent items: port number 1151 for identifying the port number whose settings are to be configured; I/F type 1152 that indicates the type of interface used at the port concerned; band 1153 that indicates the band allocation proportion for one path; priority 1154 that indicates the use priority of the I/F; priority time 1155 that indicates the priority time for using the I/F; and error rate 1156 that indicates the error rate at which a change of settings is required (threshold: tolerable error rate). The I/F type 1152 is obtained from each device upon implementation of the IT system 1, and the information written therein is thereafter updated whenever there is a change due to deletion or addition. The band 1153 and the priority 1154 are information set by the administrator through the input/display unit 9101. For the priority 1154, for example, a value may indicate greater importance the closer it is to 1. The priority time 1155 indicates, with respect to each path comprising a plurality of interfaces, the time bands during which the respective interfaces are to be used with priority. By way of example, assuming a case where data simultaneously arrives at two interfaces, the data that has arrived at which interface is to be sent out first is determined by the above-mentioned time bands.

When the display performance graph button 1110 is pushed, the status of the performance the system has provided up to that point (history: the graphs shown in FIG. 12, for example) is displayed. More specifically, when the display performance graph button 1110 is pushed, an inquiry display (not shown) with respect to which port of which device is to be selected is displayed, and once the desired port number is selected by the administrator in accordance therewith, the corresponding performance graph is displayed.

By way of example, when the gather information button 1120 is pushed, the monitoring unit (monitoring program) 9103 of the management device 60 transmits an information gathering request to each device, and obtains from each device the information gathered at each device in response thereto.

When the set information button 1130 is pushed, it becomes possible to change the settings displayed on the input/display screen 1100 in FIG. 11.

<Performance Display>

Figure 12:
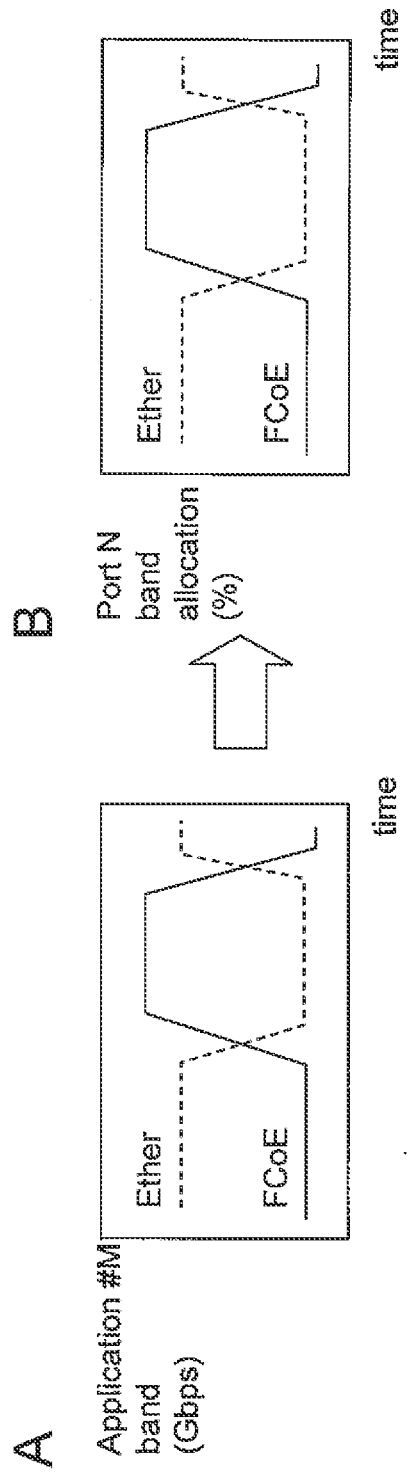
FIG. 12 is a diagram showing examples of utilization rate fluctuation d hand allocation change.
Figure 13:
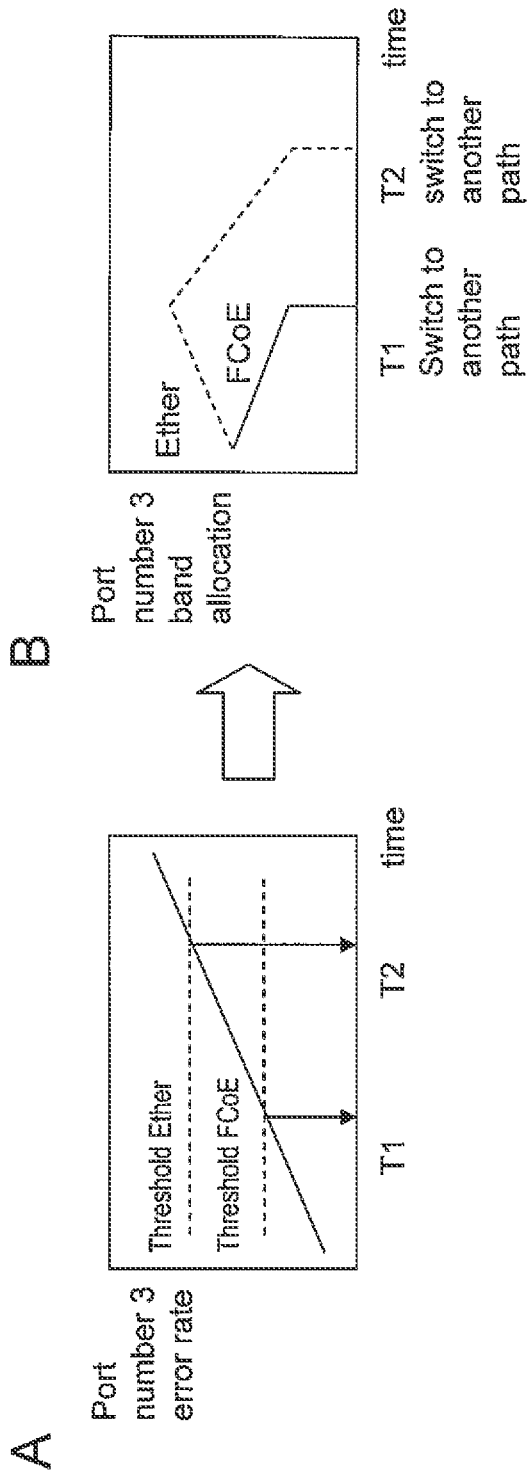
FIG. 13 is a diagram showing examples of error ate fluctuation and a path switching process.

FIGS. 12 and 13 are diagrams showing examples of performance graph displays (FIGS. 12A and 13A) and examples of band allocations set in accordance with the acquired performance (FIGS. 12B and 13B).

(i) FIG. 12A is a diagram showing utilization rate proportions (history), acquired by the management device 60, of the Ether (registered trademark) and FCoE bands that an application #M (example) at a given host device 2 uses. This graph is information that is acquired by pushing the display performance graph button 1110 and specifying the target for history acquisition. As can be seen, FIG. 12A indicates that the utilization rates of the bands vary depending on the time hand.

The administrator sees FIG. 12A, and based on the utilization rate fluctuation therein, may set the allocated bands from that point on with respect to the interfaces. When band allocations at port number N (denoting the port number used by the host device 2 in question in order to run application #M) set based on FIG. 12A are set, the result would resemble FIG. 12B. Specifically, the band allocation (band 1153) and the priority time 1155 are inputted by the administrator.

(ii) FIG. 13A is a diagram showing error rate fluctuation history with respect to port number 3 of some device as acquired by the management device 60. Further, FIG. 13B is a diagram illustrating changes in band allocation amounts, and the timing of path switching that is executed in accordance with FIG. 13A.

As shown in FIG. 13A, at time T1, the error rate exceeds the threshold for FCoE, and at time T2, the error rate exceeds the threshold for Ether (registered trademark). Since the error rate becomes unviable for use at times T1 and T2, each of FCoE and Ether (registered trademark) is switched to another path (if there is one that may be switched to). However, a path switching process such as that shown in FIG. 13B is performed. Specifically, as discussed above, while data that is communicated using FCoE of port number 3 is switched to another path at time T1, control is performed in such a manner that the band allocation amount is gradually decreased leading up to time T1, and a switch to another path (which path to switch to may be determined in advance, or it may be a path that is open at that point) is made once the error rate exceeds the threshold (the threshold for FCoE). Control is performed in such a manner that the band allocation to communications data using Ether (registered trademark) increases up to time T1 by amounts corresponding to the decrease in the band allocation to FCoE. Then, from time T1 up to time T2 at which the error rate exceeds the threshold for Ether (registered trademark), the band allocation amount with respect to Ether (registered trademark) is gradually decreased (or made constant), and once the error rate exceeds the threshold for Ether (registered trademark), a switch to another path is made with respect to Ether (registered trademark) as well.

(iii) The allocation of bands for each port number is thus controlled. However, although it may become possible to utilize bands efficiently among the ports (i.e., point-to-point), it still is not made possible to adjust the balance of band allocation with respect to the IT system 1 as a whole. As such, as will be discussed later, the adjustment unit (adjustment program) 9102 adjusts the balance of band allocation in such a manner as not to compromise the balance of the system as a whole.

<Parameter Setting Process>

Figure 14:
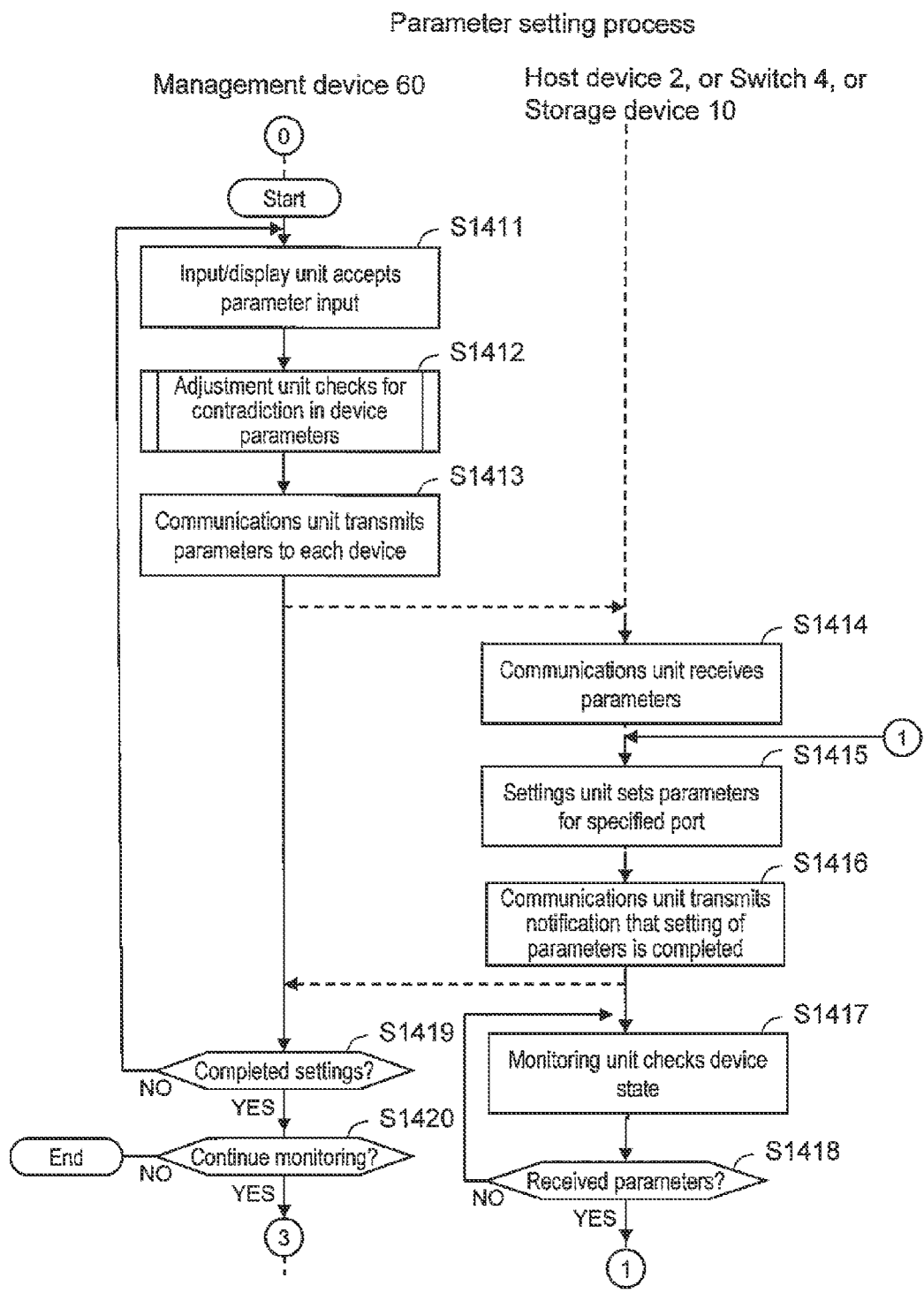
FIG. 14 is a flowchart illustrating a parameter setting process.

FIG. 14 is a flowchart illustrating a process (parameter setting process) for setting parameters prior to system implementation, or for when the administrator voluntarily changes the set parameters while the system is running.

The input/display unit 9101 of the management device 60 displays the input/display screen 1100 (see FIG. 11) on the display device of the management device 60, and accepts parameters inputted by the administrator (S1411). The parameters inputted here may be, for example, of the items shown in FIG. 11 the band 1153, the priority 1154, the priority time 1155, and the error rate 1156.

The adjustment unit 9102 checks whether or not there are any contradictions among the parameters set at each device (S1412). Executing this process as to whether or not there are any "contradictions" may involve checking to make sure that, within the same path, the band allocation to Ether (registered trademark) is not, for example, 50% while the band allocation to FCoE is 60%, or executing the process in FIG. 15 discussed below (a process of achieving a balance within the system).

The communications unit 9104 transmits, to each device, parameters that have been set with respect to each device, that are free of contradictions, and that achieve system balance (S1413). The arrangement may be such that only the parameters needed at a given device are sent to that device, or that all parameters are transmitted to all devices at once, where the necessary parameters are selected at each device.

At the host devices 2, the switch 4, and the storage devices 10, the communications unit 9203 receives the parameters transmitted from the management device 60 (S1414).

The settings unit 9201 of each device sets the parameters with respect to the specified ports (S1415).

Once the setting of parameters is completed, the communications unit 9203 of each device then notifies the management device 60 that the setting of parameters has been completed (S1416). It is noted that, in the case of a settings error, an error notification is transmitted to the management device 60.

Until new parameters are received, the monitoring unit 9202 of each device continues to monitor the state (access status: TOPS, utilization rate/load rate of the CPU, response time, etc.) of the device operating on the parameters that have been set (S1417).

The communications unit 9203 of each device determines whether or not new parameters have been received from the management device 60 (S1418). If they have been received, the process moves on to S1415. If not, the monitoring process (S1417) is continued.

On the other hand, upon receiving a notification from a given device, the management device 60 determines whether or not the notification is a setting completion notification (S1419). If it is a setting completion notification, the process moves on to S1420, whereas if it is not a setting completion notification, the process moves on to S1411.

The monitoring unit 9103 of the management device 60 determines whether or not monitoring is to be continued (S1420). By way of example, if system operation is to be continued, monitoring is continued, and the process moves on to S1721 (see FIG. 17B), whereas if system operation is to be suspended, the process is terminated.

<Details of S1412>

Figure 15:
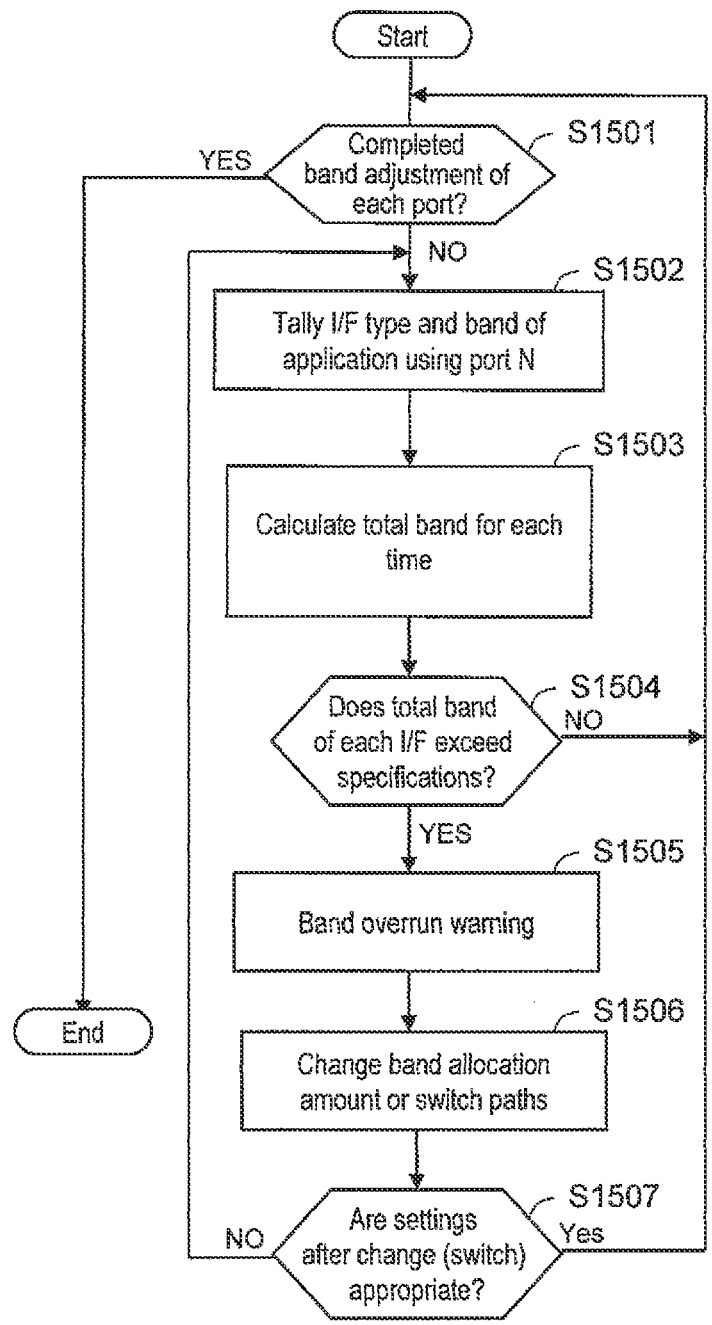
FIG. 15 is a flowchart illustrating a system balance check process (corresponding to the details of S1412 and the details of S2018).
Figure 16:
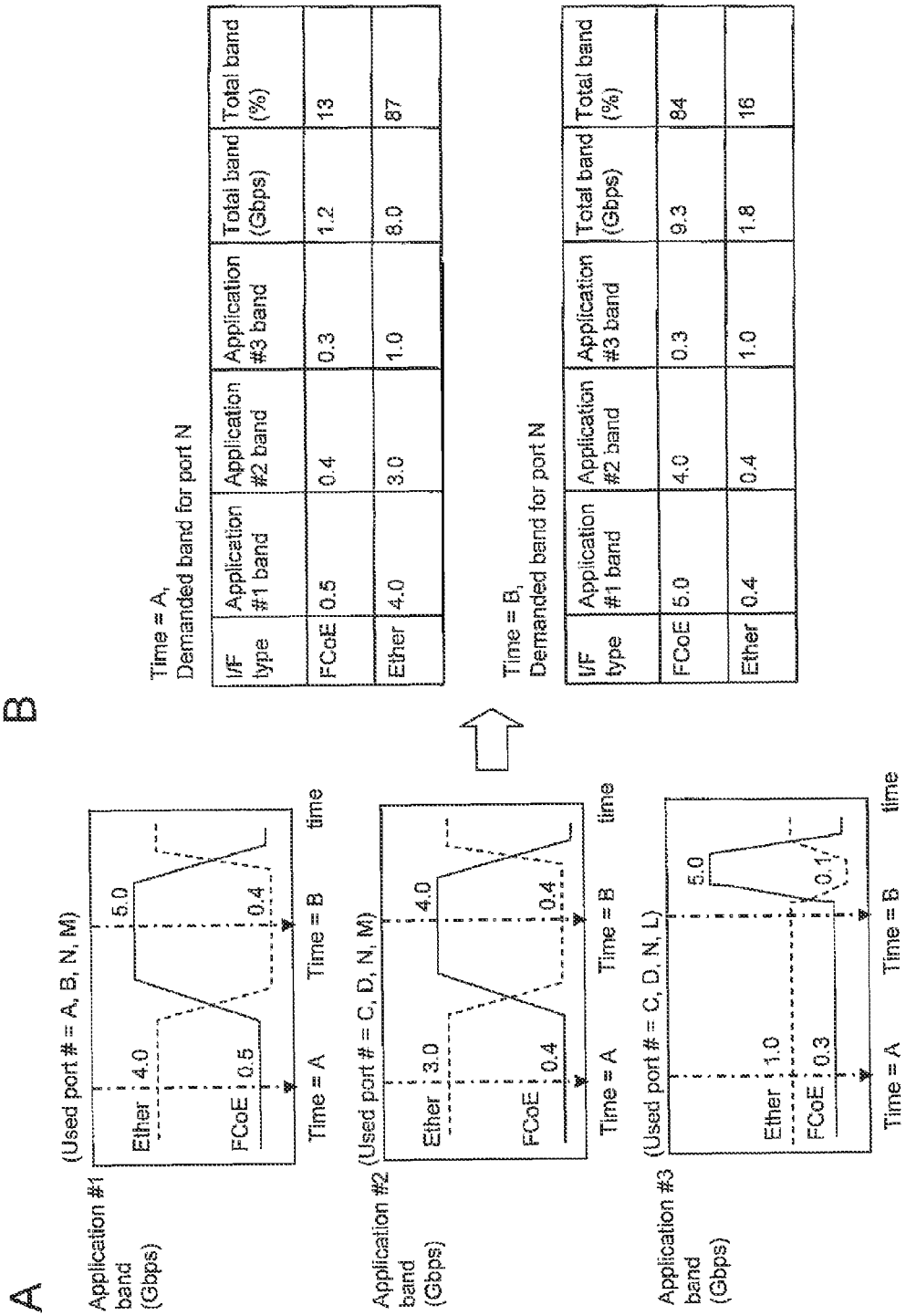
FIG. 16 is a diagram illustrating a hand allocation amount changing process with respect to a system balance check.

FIG. 15 is a flowchart illustrating the details of the process for checking the balance of the system as a whole (S1412). FIG. 16 is a diagram showing a specific example of the balance check process.

The adjustment unit 9102 (or, in the case of the variation, the adjustment unit 1021, which likewise applies to the discussion hereinafter) determines whether or not the adjustment of the band allocation amounts for each port has been completed (S1501). If adjustment has been completed, the process is terminated. If not, the process moves on to S1502.

The adjustment unit 9102 tallies the I/F types of the application of the host device 2 that uses port number N, and the allocated band amounts. By way of example, as shown in FIG. 16A, the adjustment unit 9102 acquires information on utilization rates that have been set (demanded) for application #1 that uses ports A, B, N and M, information on utilization rates that have been set (demanded) for application #2 that uses ports C, D, N and M, and information on utilization rates that have been set (demanded) for application #3 that uses ports C, D, N and L. Then, as shown in FIG. 16B, at times A and B, the adjustment unit 9102 tallies the respective demanded band amounts for application #s 1 through 3 (band amounts calculated from the parameters for each time band as set in S1411) that are demanded with respect to each port number (only port number N is shown in FIG. 16B). This tallying process is also executed for the other ports (A, B, C, D, M and L) that the applications use.

The adjustment unit 9102 next calculates the total band at each time with respect to each port concerned as tallied in S1502 (S1503). By way of example, as shown in FIG. 16B, for port number N, it is 9.2 Gbps at time A (1.2+8.0=9.2), and 11.1 Gbps at time B (9.3+1.8=11.1.).

The adjustment unit 9102 then determines, with respect to each time band (e.g., times A and B), whether or not the total band allocation amount demanded for each I/F exceeds specifications (the band amount tolerated for that path) (S1504). If the total allocated band amount for the I/Fs does not exceed the tolerable amount, the process moves on to S1501, whereas if it does, the process moves on to S1505.

The adjustment unit 9102 outputs a band overrun warning for the administrator (S1505). By way of example, with respect to the input/display screen 1100, the adjustment unit 9102 may differentiate the manner of display of the fields of the interface for the relevant port number from that of the other fields, thereby drawing the attention of the administrator.

Further, the adjustment unit 9102 executes a process of changing the band allocation amounts or of switching paths (S1506). Specifically, in the case of changing band allocation, the adjustment unit 9102 retains the fluctuations in the used bands (FIG. 16A) per time (e.g., times A and B) with respect to each application (e.g., application #s 1 through 3), while changing the hands so that they are allocated at appropriate times (during time bands where there is room in the band). In addition, if the total value of the band allocation amounts at a given time exceeds the tolerable value, instead of changing the time hand, the priorities of the applications may be defined in advance, and the allocation amounts for the applications with lower priority decreased. In so doing, weightings may be assigned to allocation decrease amounts in accordance with priority (e.g., decreasing application #1 in increments of 1%, application #2 in increments of 2%, and application #3 in increments of 1.5%, etc.) to adjust band allocation amounts. In addition, if paths are to be switched, the adjustment unit 9102 checks the overall setting parameters that are set within the system, extracts a path that has room in terms of band allocation amount, and switches to that path. It is noted that band allocation amounts may be changed, or paths switched, in accordance with instructions from the administrator.

The adjustment unit 9102 subsequently determines whether or not the band allocation as changed, or the path switch, is appropriate. By way of example, the adjustment unit 9102 determines whether or not the total band allocation amount as changed exceeds the tolerable amount for the bands for the paths concerned with respect to each time band (e.g., times A and B), or whether or not the band allocation amount after paths have been switched (the hand allocation amounts of the path switched to and of the path switched from) exceeds the tolerable amount for the bands of the paths concerned (the path switched to and the path switched from). If the settings after the change are appropriate, the process moves on to S1501. On the other hand, if not, the process moves on to S1502, and an adjustment process is executed again for the same port.

<Statistical Information Acquisition Process>

Figure 17A:
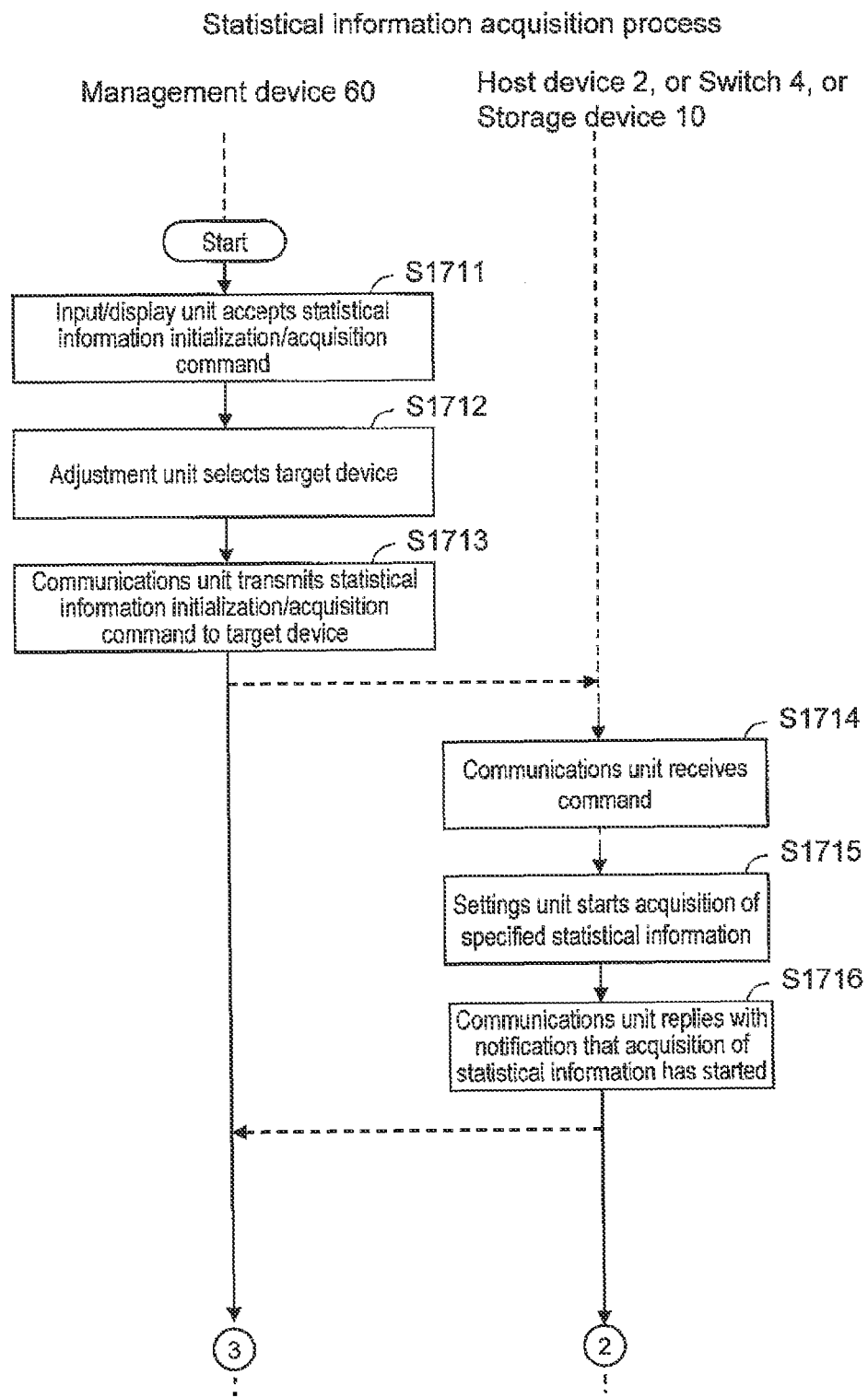
FIG. 17A is a flowchart (1) illustrating a statistical information acquisition process.
Figure 17B:
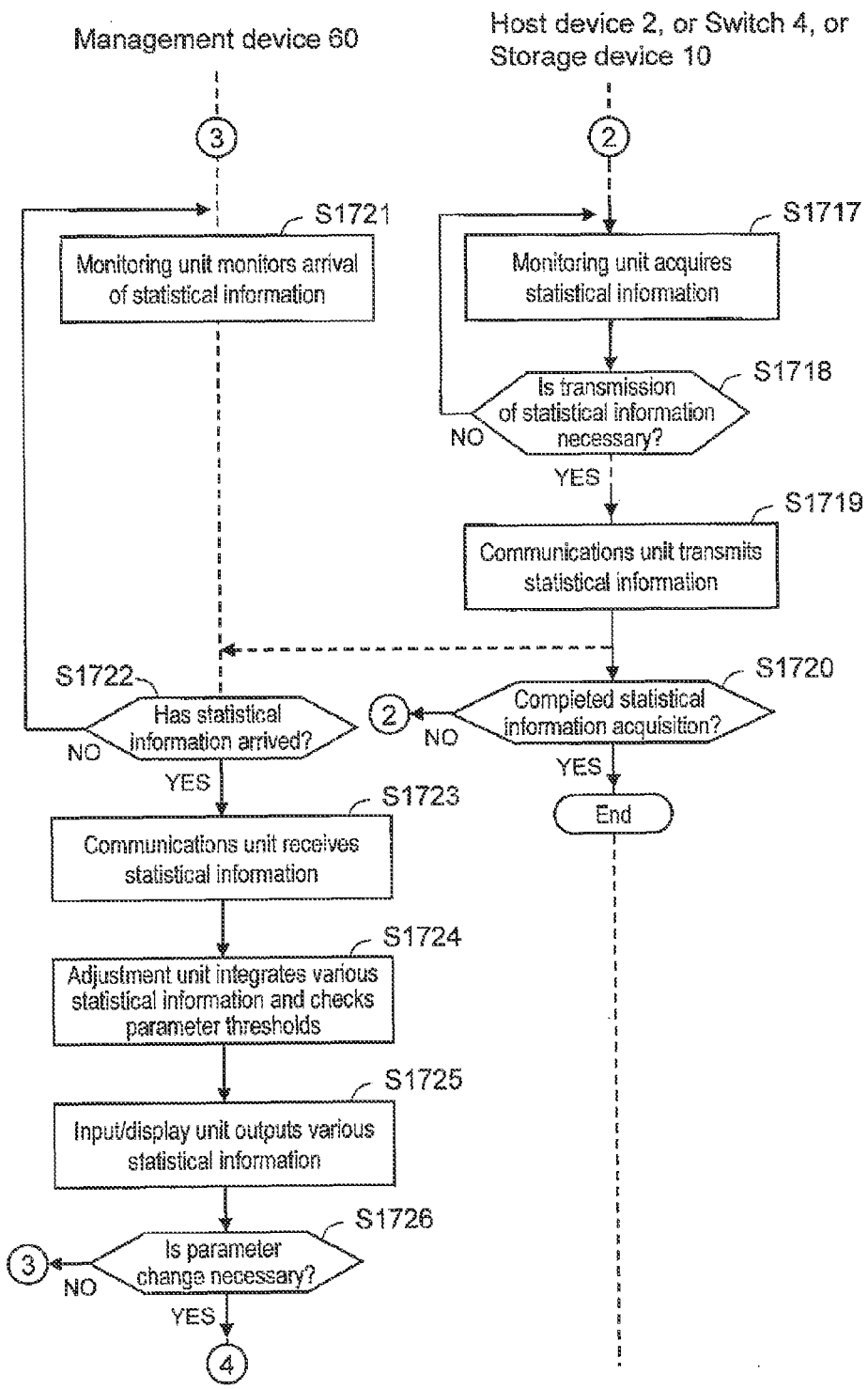
FIG. 17B is a flowchart (2) illustrating a statistical information acquisition process.

FIG. 17 is a flowchart illustrating a statistical information acquisition process that is executed with predetermined timing. The expression "predetermined timing" as used above may refer to a variety of timings, periodical time intervals, a pre-set and arbitrary time, in the event of a failure in some device, etc., and may alternatively be worded as "desired timing." Further, the term "statistical information," as mentioned earlier, refers to information comprising access information, such as the band usage amounts with respect to the path (port) of the device concerned, TOPS, response time, etc., as well as the utilization rate, load rate, etc., of the CPU of the device concerned.

The input/display unit 9101 of the management device 60 accepts an initialization command and acquisition command for statistical information inputted by the administrator (S1711). The statistical information acquisition command is a command for making the device concerned transmit its own statistical information to the management device 60, and the statistical information initialization command is a command for clearing statistical information at the device concerned after transmission of statistical information.

Based on instructions from the administrator, the adjustment unit 9102 of the management device 60 (parent management program) specifies the device (or a portion of the ports of the device) for which statistical information is to be acquired (S1712). It is noted that, with respect to the plurality of timings for the statistical information acquisition process, rules may be set in advance with regard to how the target device is to be specified, e.g., deciding the target for acquisition in advance, etc.

The communications unit 9104 of the management device 60 transmits to the target device specified in S1712 a statistical information initialization command and a statistical information acquisition command (S1713).

The communications unit 9203 of the target device (the host device 2, the switch 4, the storage device 10) receives the statistical information acquisition command and initialization command transmitted from the management device 60 (S1714).

The settings unit 9201 of the target device instructs the monitoring unit 9202 to start acquiring the statistical information specified by the statistical information acquisition command (S1715).

The communications unit 9203 of the target device notifies the management device 60 that the acquisition of statistical information has started at the target device (S1716).

The monitoring unit 9202 of the target device acquires statistical information (S1717), determines whether or not it is necessary to transmit statistical information, and continues the acquisition of statistical information until it becomes necessary (S1718). It is noted that the necessity of transmitting statistical information is determined based on whether or not the requisite amount of statistical information for determining whether or not current parameters need to be changed has been acquired.

Once it is determined that statistical information needs to be transmitted, the communications unit 9203 of the target device transmits the acquired lot of statistical information to the management device (S1719).

Once the acquisition of statistical information is completed, the process is terminated (S1720).

On the other hand, at the management device 60, once the communications unit 9104 receives a notification from the target device that the acquisition of statistical information has started, the monitoring unit 9103 monitors whether or not the statistical information in question has arrived from the target device (S1721).

The monitoring unit 9103 then determines whether or not the statistical information has arrived (S1722). If not, the monitoring operation is continued (S1721). If it has, the process moves on to S1723.

The communications unit 9104 receives the statistical has arrived (S1723).

The adjustment unit 9102 then integrates the various items of statistical information received, and compares them with parameter thresholds (S1724). Specifically, the parameters set in FIG. 11 and the received statistical information are compared with respect to each I/F, and it is checked whether or not thresholds are exceeded.

The input/display unit 9101 outputs the received statistical information on the display screen along with the check results from S1724 (S1725). In so doing, statistical information that exceeds a threshold may be displayed in some special manner (e.g., changing the color, in a blinking fashion, etc.) to draw attention. It is noted that examples of the information outputted in S1725 (parameter management table) are shown in FIG. 18.

Figure 19:
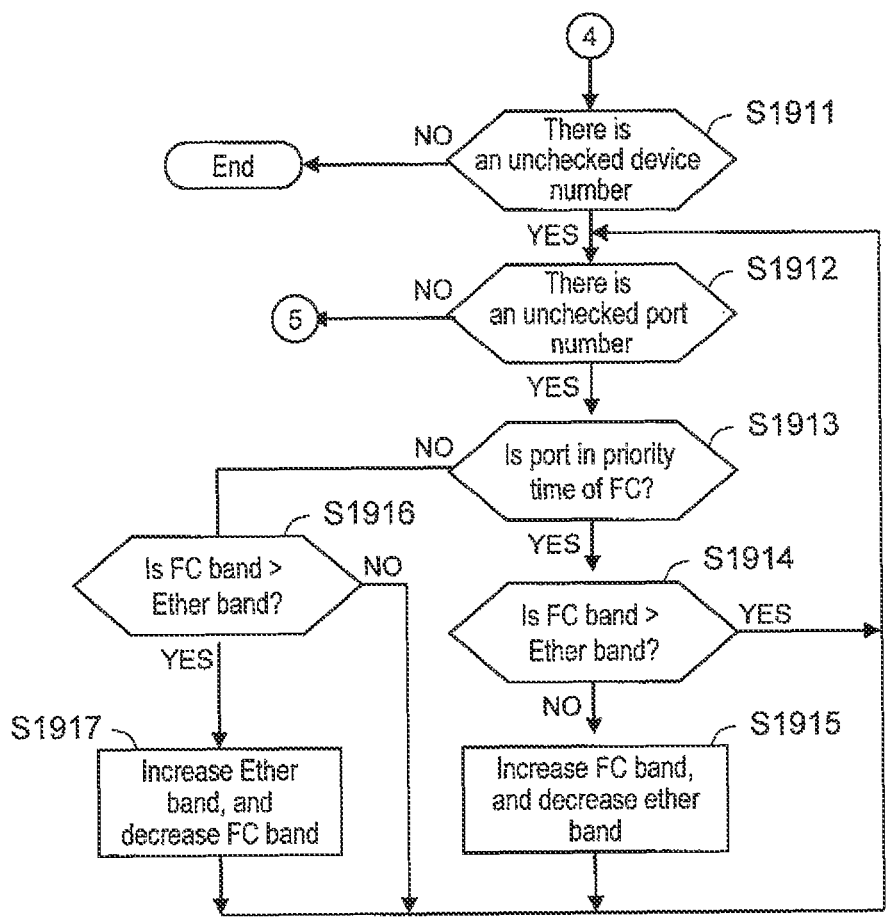
FIG. 19 is a flowchart illustrating a parameter change determining and changing process (band allocation amount change).
Figure 20:
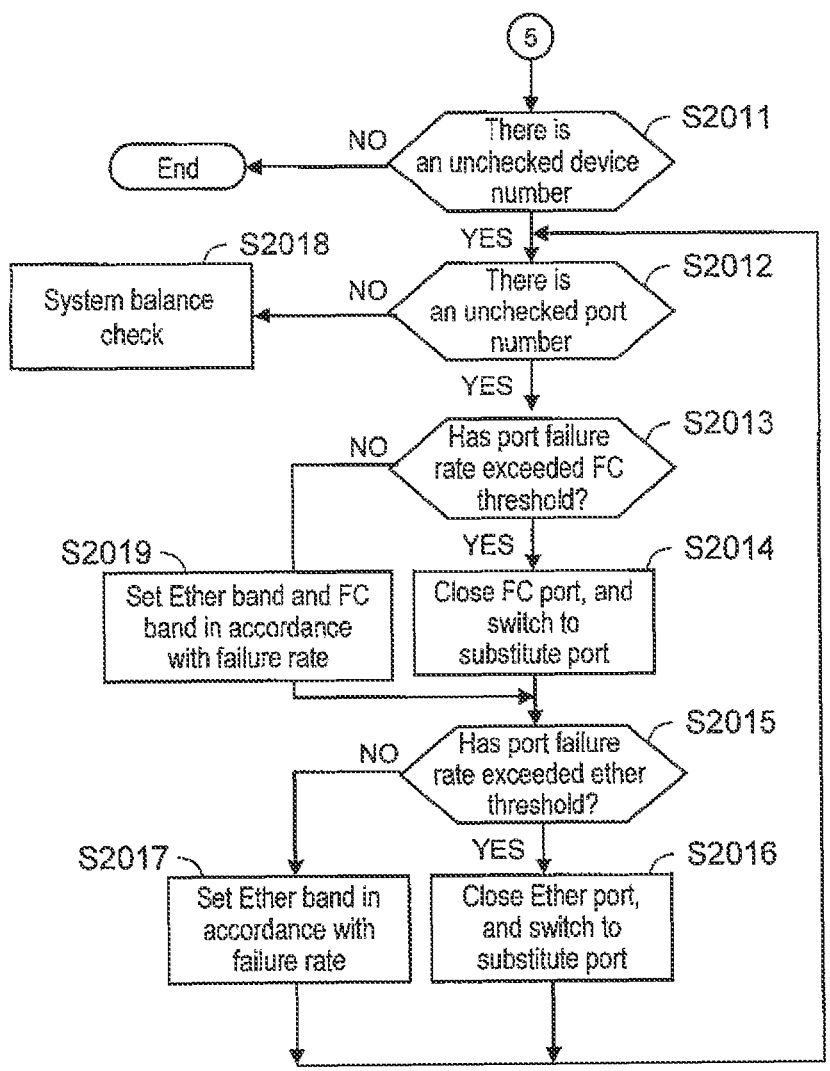
FIG. 20 is a flowchart illustrating a parameter change determining and changing process (path switching).

The adjustment unit 9102 determines whether or not it is necessary to execute a parameter change determining and changing process (FIGS. 19 and 20). Specifically, by way of example, a determination may be made in accordance with instructions inputted by the administrator, or it may be so arranged that it is determined that the process above needs to be executed if there is even one item of statistical information that exceeds a threshold. If there is no need for a parameter change, the process moves on to S1721. If a parameter change is needed, the process moves on to S1911.

<Parameter Management Table>

FIG. 18 is a diagram showing a structure example of a parameter management table 1800 that compares and displays set parameters and acquired statistical information. Through this parameter management table 1800, it may be determined whether or not the current set parameters should be changed.

The parameter management table 1800 comprises, as constituent items: device number 1801, which is identification information for identifying/specifying the device from which the statistical information was acquired; port number 1802, which is identification information for specifying/identifying a port number of the device concerned; I/F type 1803, which is information indicating the type of interface provided for the port in question; priority time 1804, which indicates the time band during which the interface in question can be used with priority; failure rate 1805, which indicates the rate of failures (errors) for the interface in question contained in the acquired statistical information; band 1806, which is comparable to that previously discussed; priority 1807, which is comparable to that previously discussed; and substitute port 1808, which indicates a switch candidate as to which port of which device may be switched to when performing path switching.

The failure rate (error rate) 1805 is information contained in the actually acquired statistical information. The priority time 1804, the band 1806, and the priority 1807 are parameters that are already set.

The substitute port 1808 is referenced when the acquired error rate 1805 exceeds the threshold 1156 for error rate, and port switching is executed based thereon. There may be a plurality of substitute ports (switch candidates) 1808 for the interfaces of one port number. By way of example, a value of 2-0 for the substitute port would indicate that port number 0 of device number 2 is available as a switch candidate.

<Parameter Change Determining and Changing Process>

FIGS. 19 and 20 are flowcharts illustrating a parameter change determining and changing processes. FIG. 19 is a process regarding a change in band, and FIG. 20 is a process regarding path switching. It is noted that although, in the present embodiment, a band change is executed first, and path switching thereafter, the two may instead be executed in reverse order, or the two may be executed in parallel. It is noted that, in the present embodiment, a system balance check process is appended to the process that is executed later (FIG. 20).

(i) Band Change (FIG. 19)

The adjustment unit 9102 of the management device 60 references the parameter management table 1800, and determines whether or not there are any devices that are as yet unchecked with respect to band change (S1911). If there are no unchecked devices, the process is terminated, whereas if there is an unchecked device, the process moves on to S1912.

The adjustment unit 9102 references the parameter management table 1800, and determines whether or not there are any ports that are as yet unchecked with respect to band change (S1912). If there are no unchecked ports, the process moves on to S2011, whereas if there is an unchecked port, the process moves on to S1913.

With respect to the port to be processed, the adjustment unit 9102 determines whether or not the current time falls within the priority time band of FC (S1913). If the current time falls within the priority time band of FC, the process moves on to S1914, whereas if not, the process moves on to S1916.

In S1914, the adjustment unit 9102 determines whether or not the band of FC at that point is greater than the band of Ether (registered trademark). The process moves on to S1912 if it is greater, or on to S1915 if it is less.

in S1915, the adjustment unit 9102 executes a process where the allocation of the band of FC is increased and where the allocation of the band of Ether (registered trademark) is decreased, thereby having the band allocation amount of FC be greater than the band allocation amount of Ether (registered trademark).

On the other hand, in S1916, the adjustment unit 9102 determines whether or not the band of FC at that point is greater than the band of Ether (registered trademark), The process moves on to S1917 if it is greater, or on to S1912 if it is less.

In S1917, the adjustment unit 9102 executes a process where the allocation of the band of Ether (registered trademark) is increased and where the allocation of the band of FC is decreased, thereby having the band allocation amount of Ether (registered trademark) be greater than the band allocation amount of FC.

(ii) Path Switching (FIG. 20)

The adjustment unit 9102 of the management device 60 references the parameter management table 1800, and determines whether or not there are any devices that are as yet unchecked with respect to path switching (S2011). If there are no unchecked devices, the process is terminated, whereas if there is an unchecked device, the process moves on to S2012.

The adjustment unit 9102 references the parameter management table 1800, and determines whether or not there are any ports that are as yet unchecked with respect to path switching (S2012). If there are no unchecked ports, the process moves on to S2018, whereas if there is an unchecked port, the process moves on to S2013.

The adjustment unit 9102 determines whether or not the port failure rate for FC acquired as statistical information (i.e., the actual error rate) exceeds the error rate threshold for FC (FIG. 11: the error rate 1156) (S2013). If the actual error rate exceeds the error rate threshold for FC, the process moves on to S2014, whereas if not, the process moves on to S2019.

In S2014, the adjustment unit 9102 closes the FC port concerned, and switches the path to the substitute port that is provided (see 1808 in FIG. 18). It is noted that if no substitute port is provided in advance, another port that has room may be searched for and switched to.

in S2019, the adjustment unit 9102 set the bands of Ether (registered trademark) and FC in accordance with the failure rate (error rate). Here, when parameters currently used do not have a specific problem, it is not necessary to purposely alter the bands.

The adjustment unit 9102 subsequently determines whether or not the port failure rate for Ether (registered trademark) acquired as statistical information (i.e., the actual error rate) exceeds the error rate threshold for Ether (registered trademark) (FIG. 11: the error rate 1156) (S2015). If the actual error rate exceeds the error rate threshold for Ether (registered trademark), the process moves on to S2016, whereas if not, the process moves on to S2017.

In S2016, the adjustment unit 9102 closes the Ether (registered trademark) port, and switches the path to the substitute port that is provided (see 1808 in FIG. 18).

In addition, in S2017, the band of Ether (registered trademark) is set in accordance with the failure rate (error rate). If there is nothing wrong n particular with the parameters at that point, the band need not be changed.

Once the settings change determining and changing process is completed for all devices and ports, the adjustment unit 9102 executes a system balance check process (S2018). The system balance check process would be a process similar to that shown in FIG. 15. However, whereas, in FIG. 15, what was tallied with respect to allocated band amount were the parameters set in S1411, what is tallied with respect to allocated band amount in the balance check process in FIG. 20 are the parameters that are changed through the parameter change determining and changing process. The process is otherwise similar to that in FIG. 15, and a detailed description will therefore be omitted herein.

<Conclusion>

In an embodiment of the present invention, upon system implementation (or at some suitable point after implementation) and in response to instructions by the administrator, the management device sets communications parameters including band allocation information with respect to a plurality of interfaces (including Ether (registered trademark), FCoE, and iSCSI) of communications paths. For a while, the host devices, the switch device, and the storage devices perform communications based on those communications parameters that have been set. Then, in a predetermined timing, the management device or switch device acquires statistical information including band usage amounts with respect to the communications paths among the ports of the devices, and, based on that statistical information, changes the band allocations that have been set with respect to the plurality of interfaces. Further, after the band allocations have been changed, the management device or switch device checks the balance among the allocated bands of the IT system. More specifically, if there are a plurality of applications using the same communications path, it is determined whether or not the band allocations as changed are appropriate within that same communications path (see FIG. 16). Thus, should the band usage amounts become incongruent with set values over the course of the IT system's operation, it is possible to update band allocations (communications parameters) dynamically and appropriately. Further, it becomes possible to check whether or not, after band allocations have been changed, the balance of band allocations within the system has become compromised. It is noted that, if the band allocations as changed are inappropriate (unfavorable balance), band allocations are changed again, thereby preventing band allocations within the system from becoming unbalanced.

Further, when executing a change of band allocations, the management device or switch device references statistical information, grasps temporal changes in the band amounts used by a plurality of applications, and changes the allocated times for the bands with respect to at least one of the plurality of applications. By thus causing a transition of band allocations from a time band in which the band utilization rates are high to a time band in which they are low, it becomes possible to efficiently utilize bands in communications paths.

Communications parameters comprise information on tolerable error rates which indicate error rates that are tolerated for the respective plurality of interfaces of communications paths. Further, statistical information comprises information on actual error rates which indicate the rates of communication errors of the communications paths. In this case, the management device or switch device determines whether or not the actual error rates exceed the respective tolerable error rates of the plurality of interfaces, and switches communications paths to other paths for communications that use interfaces exceeding their corresponding tolerable error rates. The management device or switch device then determines whether or not the band allocations with respect to the communications paths after the switch are appropriate. Thus, it becomes possible, for each different type of interface, to dynamically switch from a path that has a high communication error rate and is inappropriate for communications to a path that is more appropriate. It is noted that, if the band allocations with respect to the communications paths after the switch are inappropriate, path switching to another communications path is performed again. Further, by way of example, if communications via FCoE (a first interface) and communications via Ether (registered trademark) (a second interface) are performed in a communications path, and the tolerable error rate for communications via FCoE (a first error rate) is so set as to be lower than the tolerable rate for communications via Ether (registered trademark) (a second error rate), the management device or switch device increases the band allocation amount for communications via Ether (registered trademark) when decreasing the band allocation amount for communications via. FCoE until the actual error rate becomes higher than the first error rate, and once the actual error rate becomes higher than the first error rate, switches the communications path for communications via FCoE to another communications path. Further, once the actual error rate becomes higher than the second error rate, the communications path for communications via Ether (registered trademark) is switched to another communications path. Thus, communications paths may be switched for each type of interface, thereby enabling efficient utilization of the system's resources.

The present invention may also be realized through program codes of software that realize the functions of the embodiments. In such cases, a storage medium on which program codes are recorded is supplied to a system or device, and a computer (or CPU/MPU) of that system or device reads the program codes stored on the storage medium. In such cases, the program codes themselves that are read from the storage medium would realize the functions of the above-discussed embodiments, and the program codes themselves, as well as the storage medium that stores them, would form the present invention. For the storage medium for supplying such program codes, by way of example, there may be used a flexible disk, CD-ROM, DVD-ROM, hard disk, optical disk, magneto-optical disk, CD-R, magnetic tape, non-volatile memory card, ROM, etc.

In addition, based on instructions of program codes, an OS (operating system), etc., running on a computer may perform some or all of the actual processing, thereby realizing the functions of the above-discussed embodiments through such processing. Further, after the program codes read from the storage medium are written to the memory on the computer, the CPU, etc., of the computer may perform some or all of the actual processing based on the instructions of those program codes, thereby realizing the functions of the above-discussed embodiments through such processing.

Further, by being distributed via a network, program codes of software that realize the functions of the embodiments may be stored on a storage means of the system or device, e.g., a hard disk, memory, etc., or on a storage medium, e.g., CD-RW, CD-R, etc. At the time of use, a computer (or CPU/MPU) of that system or device may read and execute the program codes stored on the storage means or the storage medium.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. In addition, various inventions may be formed through appropriate combinations of a plurality of elements disclosed in the embodiments. By way of example, some of the elements indicated in the embodiments may be omitted. Further, elements across different embodiments may be combined as deemed appropriate. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java (registered trademark), etc, Further, in the embodiments described above, only those control lines and data lines that are considered necessary for purposes of explanation are shown, and not all of the control lines and data lines of a finished product are necessarily shown. All elements may be interconnected.

Moreover, other implementations of the invention AI be apparent to those skilled in the art from consideration of the specification and practice of the invention disclosed herein, Various aspects and/or components of the described embodiments may be used singly or in any combination in a computerized storage system having data management functionality. It is intended that the specification and examples be considered as exemplary only, with the true scope and spirit of the invention being indicated by the following claims.

REFERENCE SIGNS LIST

1: IT system
2: Host device
3: Storage system
4: Switch
5: Storage network
6, 8: Communications line (communications cable)
10: Storage device (storage subsystem)
41, 110: Communications port
50: Management network
60: Management device

What is claimed is:

1. A computer system comprising: at least one host device comprising a host port used for communications;
at least one storage device comprising a storage port used for communications, the storage device being adapted to provide information to the at least one host device;
at least one switch device comprising a plurality of switch ports used for communications, the switch device being adapted to define a communications path between the at least one host device and the at least one storage device; and
a management device coupled with the at least one storage device, the at least one host device, and the at least one switch device, the management device being adapted to manage settings at the respective devices, wherein communications paths among the host port, the storage port and the switch ports comprise a plurality of interfaces,
the management device sets a communications parameter comprising band allocation information including tolerable error rates indicating error rates respectively tolerated with respect to the plurality of interfaces of the communications paths,
communications via a first interface and communications via a second interface are performed in the communications paths, a first error rate, which is a tolerable error rate for the communications via the first interface, is so set as to be lower than a second error rate, which is a tolerable error rate for the communications via the second interface,
the host device, the switch device, and the storage device communicate based on the communications parameter that has been set, and the management device or the switch device acquires statistical information comprising a band usage amount and actual error rates indicating communication error rates with respect to the communications paths among the host port, the storage port, and the switch ports, and changes, based on the statistical information, a band allocation that is set with respect to the plurality of interfaces, and, further, determines whether or not the band allocation as changed is appropriate with respect to the computer system,
the management device or the switch device determines whether or not the actual error rates exceed the respective tolerable error rates of the plurality of interfaces, switches a communications path to another communications path with respect to communications that use an interface for which the tolerable error rate is exceeded, and determines whether or not the band allocation is appropriate with respect to the communications path switched to, and,
whereby the management device or the switch device increases a band allocation amount for the communications via the second interface when decreasing a band allocation amount for the communications via the first interface until the actual error rate becomes higher than the first error rate, and switches a communications path for the communications via the first interface to another communications path once the actual error rate becomes higher than the first error rate.

2. A computer system according to claim 1, wherein, if the band allocation as changed is inappropriate, the management device or the switch device changes the band allocation again.

3. A computer system according to claim 1, wherein, if there are a plurality of applications that use the same communications path, the management device or the switch device determines whether or not the band allocation as changed is appropriate within the same communications path.

4. A computer system according to claim 3, wherein the management device or the switch device references the statistical information, grasps a temporal change in band amounts used by the plurality of applications, and changes a band allocation time with respect to at least one of the plurality of applications, thereby executing a change in the band allocation.

5. A computer system according to claim 1, wherein, if the band allocation is inappropriate with respect to the communications path switched to, the management device or the switch device switches paths again to another communications path.

6. A computer system according to claim 1, wherein the management device or the switch device switches a communications path for the communications via the second interface to another communications path once the actual error rate becomes higher than the second error rate.

7. A management method for a computer system that comprises at least one host device, at least one storage device adapted to provide information to the at least one host device, at least one switch device adapted to define a communications path between the at last one host device and the at least one storage device, and a management device that is coupled with the at least one storage device, the at least one host device, and the at least one switch device, and that is adapted to manage settings at the respective devices, where communications paths among a host port of the host device, a storage port of the storage device, and a switch port of the switch device comprise a plurality of interfaces, the management method comprising:
  a step in which the management device sets a communications parameter comprising band allocation information including tolerable error rates indicating error rates respectively tolerated with respect to the plurality of interfaces of the communications paths;
  a step in which the host device, the switch device, and the storage device communicate based on the communications parameter that has been set;
  a step in which the management device or the switch device acquires statistical information comprising a band usage amount and actual error rates indicating communication error rates with respect to the communications paths among the host port, the storage port, and the switch port;
  wherein communications via first interface and communications via a second interface are performed in the communications paths;
  a first error rate, which is a tolerable error rate for the communications via the first interface, is so set as to be lower than a second error rate, which is a tolerable error rate for the communications via the second interface;
  a step in which, based on the statistical information, the management device or the switch device changes a band allocation that is set with respect to the plurality of interfaces;
  a setup in which the management device or the switch device determines whether or not the band allocation as changed is appropriate with respect to the computer system;
  a step in which the management device or the switch device determines whether or not the actual error rates exceed the respective tolerable error rates of the plurality of interfaces;
  a step in which the management device or the switch device switches a communications path to another communications path with respect to communications that use an interface for which the tolerable error rate is exceeded; and
  a step in which the management device or the switch device determines whether or not the band allocation is appropriate with respect to the communications path switched to; and,
  whereby in the step of switching the communications path to another path, the management device or the switch device increases a band allocation amount for the communications via the second interface when decreasing a band allocation amount for the communications via the first interface until the actual error rate becomes higher than the first error rate, switches a communications path for the communications via the first interface to another communications path once the actual error rate becomes higher than the first error rate, and switches a communications path for the communications via the second interface to another communications path once the actual error rate becomes higher than the second error rate.

8. A management method according to claim 7, further comprising a step in which, if the band allocation as changed is inappropriate, the management device or the switch device changes the band allocation again.

9. A management method according to claim 7, wherein, in the step of determining whether or not the band allocation as changed is appropriate, if there are a plurality of applications that use the same communications path, the management device or the switch device determines whether or not the band allocation as changed is appropriate within the same communications path.

10. A management method according to claim 9, wherein, in the step of changing the band allocation that is set with respect to the plurality of interfaces, the management device or the switch device references the statistical information, grasps a temporal change in band amounts used by the plurality of applications, and changes a band allocation time with respect to at least one of the plurality of applications, thereby executing a change in the band allocation.

11. A management method according to claim 7, further comprising a step in which, if the band allocation is inappropriate with respect to the communications path switched to, the management device or the switch device switches paths again to another communications path.

* * * * *